United States Patent
Ni et al.

(10) Patent No.: US 12,547,631 B2
(45) Date of Patent: Feb. 10, 2026

(54) MULTI-CHANNEL SEARCH AND AGGREGATED SCORING TECHNIQUES FOR COMPLEX SEARCH DOMAINS

(71) Applicant: Optum, Inc., Minnetonka, MN (US)

(72) Inventors: Yizhao Ni, Centennial, CO (US); Cem Unsal, Alameda, CA (US); Harsh M Maheshwari, Irving, TX (US); Ramin Anushiravani, San Carlos, CA (US); Nicholas Paul Gramstad, Chanhassen, MN (US); Ayush Tomar, Morgan Hill, CA (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/390,940

(22) Filed: Dec. 20, 2023

(65) Prior Publication Data

US 2025/0068633 A1 Feb. 27, 2025

Related U.S. Application Data

(60) Provisional application No. 63/578,461, filed on Aug. 24, 2023.

(51) Int. Cl.
*G06F 16/2455* (2019.01)

(52) U.S. Cl.
CPC .............. *G06F 16/24556* (2019.01)

(58) Field of Classification Search
None
See application file for complete search history.

(56) References Cited

U.S. PATENT DOCUMENTS 6,182,068 B1 1/2001 Culliss
6,564,213 B1 5/2003 Ortega et al.
(Continued)

FOREIGN PATENT DOCUMENTS

CA 2816517 A1 4/2012
CA 2836381 A1 11/2012
(Continued)

OTHER PUBLICATIONS

Ahmad, Wasi Uddin et al. "Context Attentive Document Ranking and Query Suggestion," In Proceedings of the 42nd International ACM SIGIR Conference on Research and Development in Information Retrieval, Jul. 21-25, 2019, pp. 385-394, DOI: 10.1145/3331184.3331246.
(Continued)

*Primary Examiner* — Christopher J Raab
(74) *Attorney, Agent, or Firm* — Alston & Bird LLP

(57) ABSTRACT

Various embodiments of the present disclosure provide query processing techniques for resolving queries in a complex search domain to improve upon traditional search resolutions within such domains. The techniques may include generating a keyword and an embedding representation for an agnostic search query. The keyword representation may be compared against source text attributes within one or more domain channels to generate a plurality of keyword similarity scores between the search query and features within a search domain. The embedding representation may be compared against source embedding attributes within the one or more domain channels to generate a plurality of embedding similarity scores between the search query and the features within the search domain. The keyword and embedding similarity scores may be aggregated to generate aggregated similarity scores for identifying an intermediate query resolution for the search query. The (Continued)

intermediate query resolution may be leveraged to resolve the query.

14 Claims, 6 Drawing Sheets

(56) References Cited

U.S. PATENT DOCUMENTS

| | | |
|---|---|---|
| 6,738,754 B1 | 5/2004 | Norman, Jr. |
| 7,548,910 B1 | 6/2009 | Chu et al. |
| 7,657,522 B1 | 2/2010 | Puzicha et al. |
| 7,933,859 B1 | 4/2011 | Puzicha et al. |
| 8,100,829 B2 | 1/2012 | Rothman et al. |
| 8,312,138 B2 | 11/2012 | Hull et al. |
| 8,392,207 B2 | 3/2013 | Olaniyan |
| 8,403,847 B2 | 3/2013 | Rothman et al. |
| 8,583,450 B2 | 11/2013 | Baker et al. |
| 8,620,842 B1 | 12/2013 | Cormack |
| 8,706,530 B2 | 4/2014 | Ohnemus et al. |
| 8,793,252 B2 | 7/2014 | Subasic et al. |
| 8,972,397 B2 | 3/2015 | Imig et al. |
| 8,996,314 B2 | 3/2015 | Ohnemus et al. |
| 9,058,327 B1 | 6/2015 | Lehrman et al. |
| 9,424,532 B1 | 8/2016 | Abedini et al. |
| 9,436,760 B1 | 9/2016 | Tacchi et al. |
| 9,460,214 B2 | 10/2016 | Vuong et al. |
| 9,471,709 B1 | 10/2016 | Zinenko et al. |
| 9,977,866 B2 | 5/2018 | Norris et al. |
| 10,026,114 B2 | 7/2018 | Tolvanen et al. |
| 10,062,039 B1* | 8/2018 | Lockett ............... G06N 3/044 |
| 10,176,541 B2 | 1/2019 | Chaudhri et al. |
| 10,262,384 B1 | 4/2019 | Albro et al. |
| 10,380,210 B1 | 8/2019 | Lai et al. |
| 10,394,894 B2 | 8/2019 | Garg et al. |
| 10,409,874 B2 | 9/2019 | Cheng |
| 10,413,779 B2 | 9/2019 | Ingram et al. |
| 10,438,291 B1 | 10/2019 | Neben et al. |
| 10,489,440 B2 | 11/2019 | Sharma et al. |
| 10,770,184 B1 | 9/2020 | Mcnair |
| 10,789,309 B1 | 9/2020 | Bousquet et al. |
| 10,803,241 B2 | 10/2020 | Weisman et al. |
| 10,943,072 B1* | 3/2021 | Jaganmohan ......... G06N 5/041 |
| 10,943,178 B1 | 3/2021 | Gao et al. |
| 10,977,254 B2 | 4/2021 | Claussenelias et al. |
| 11,004,135 B1 | 5/2021 | Sandler et al. |
| 11,055,324 B1 | 7/2021 | Inoue et al. |
| 11,238,113 B2 | 2/2022 | Freese et al. |
| 11,276,089 B1 | 3/2022 | Salehie et al. |
| 11,366,966 B1 | 6/2022 | Ramsey et al. |
| 11,416,535 B2 | 8/2022 | Counts et al. |
| 11,527,326 B2 | 12/2022 | Mcnair et al. |
| 11,636,949 B2 | 4/2023 | Goldberg et al. |
| 11,748,413 B1 | 9/2023 | Yoon et al. |
| 11,775,989 B1 | 10/2023 | Hao et al. |
| 12,080,398 B2 | 9/2024 | Nida et al. |
| 2002/0103680 A1 | 8/2002 | Newman |
| 2003/0163349 A1 | 8/2003 | Ho |
| 2004/0019601 A1 | 1/2004 | Gates |
| 2004/0073538 A1 | 4/2004 | Leishman et al. |
| 2005/0060194 A1 | 3/2005 | Brown |
| 2005/0075931 A1 | 4/2005 | Pearson |
| 2005/0080786 A1 | 4/2005 | Fish et al. |
| 2005/0165627 A1 | 7/2005 | Fotsch et al. |
| 2006/0206264 A1 | 9/2006 | Rasmussen |
| 2008/0133272 A1 | 6/2008 | Marshall |
| 2008/0313119 A1 | 12/2008 | Leskovec et al. |
| 2009/0132573 A1 | 5/2009 | Reed, Jr. et al. |
| 2009/0254402 A1 | 10/2009 | Beall |
| 2009/0281719 A1 | 11/2009 | Jakobson |
| 2009/0292555 A1 | 11/2009 | Brown |
| 2010/0063846 A1 | 3/2010 | Shakamuri |
| 2010/0076786 A1 | 3/2010 | Dalton et al. |
| 2010/0131482 A1 | 5/2010 | Linthicum et al. |
| 2010/0131498 A1 | 5/2010 | Linthicum et al. |
| 2010/0179839 A1 | 7/2010 | Collins et al. |
| 2011/0077973 A1 | 3/2011 | Breitenstein et al. |
| 2011/0161110 A1 | 6/2011 | Mault |
| 2011/0264513 A1 | 10/2011 | Ratnaparkhi |
| 2012/0089413 A1 | 4/2012 | Balassanian |
| 2012/0296455 A1 | 11/2012 | Ohnemus et al. |
| 2013/0024474 A1 | 1/2013 | Kraft et al. |
| 2013/0073686 A1 | 3/2013 | Sandholm |
| 2013/0211858 A1 | 8/2013 | Ohnemus et al. |
| 2013/0232006 A1 | 9/2013 | Holcomb et al. |
| 2013/0325319 A1 | 12/2013 | Moore et al. |
| 2014/0067423 A1 | 3/2014 | Joao |
| 2014/0088986 A1 | 3/2014 | Gowdy et al. |
| 2014/0100860 A1 | 4/2014 | Stollmeyer et al. |
| 2014/0129493 A1 | 5/2014 | Leopold |
| 2014/0156308 A1 | 6/2014 | Ohnemus et al. |
| 2014/0280289 A1 | 9/2014 | Marantz et al. |
| 2014/0310013 A1 | 10/2014 | Ram et al. |
| 2014/0316811 A1 | 10/2014 | Ohnemus et al. |
| 2014/0372133 A1 | 12/2014 | Austrum et al. |
| 2014/0379755 A1 | 12/2014 | Kuriakose et al. |
| 2015/0234987 A1 | 8/2015 | Laing et al. |
| 2015/0331878 A1 | 11/2015 | Joseph et al. |
| 2016/0048646 A1 | 2/2016 | Stover et al. |
| 2016/0078101 A1 | 3/2016 | Somaiya et al. |
| 2016/0085799 A1 | 3/2016 | Kim et al. |
| 2016/0092598 A1 | 3/2016 | Mishra |
| 2016/0110826 A1 | 4/2016 | Morimoto et al. |
| 2016/0140125 A1 | 5/2016 | Goyal et al. |
| 2016/0188619 A1 | 6/2016 | Su et al. |
| 2017/0123618 A1 | 5/2017 | Porcella |
| 2017/0249713 A1 | 8/2017 | Serbinis et al. |
| 2017/0270115 A1 | 9/2017 | Cormack et al. |
| 2017/0293923 A1 | 10/2017 | Margolis et al. |
| 2017/0308583 A1 | 10/2017 | Husain et al. |
| 2018/0025334 A1 | 1/2018 | Pourfallah et al. |
| 2018/0082030 A1 | 3/2018 | Allen et al. |
| 2018/0165288 A1 | 6/2018 | Chang et al. |
| 2018/0341875 A1 | 11/2018 | Carr |
| 2019/0005409 A1 | 1/2019 | Doshi et al. |
| 2019/0163679 A1 | 5/2019 | Srinivasa et al. |
| 2019/0171728 A1 | 6/2019 | Wakankar et al. |
| 2019/0188251 A1 | 6/2019 | Liu et al. |
| 2019/0228038 A1 | 7/2019 | Mishra |
| 2019/0325031 A1 | 10/2019 | Puzicha |
| 2019/0347323 A1 | 11/2019 | Riesa et al. |
| 2020/0005149 A1 | 1/2020 | Ramanath et al. |
| 2020/0073953 A1 | 3/2020 | Kulkarni |
| 2020/0092695 A1 | 3/2020 | Vigeant et al. |
| 2020/0104395 A1 | 4/2020 | Bhatia et al. |
| 2020/0279641 A1 | 9/2020 | Nida et al. |
| 2020/0320139 A1 | 10/2020 | Duishoev et al. |
| 2020/0342010 A1 | 10/2020 | Rosomoff |
| 2020/0350072 A1 | 11/2020 | Mcewing et al. |
| 2020/0365259 A1 | 11/2020 | Chmait et al. |
| 2020/0388402 A1 | 12/2020 | Frey et al. |
| 2020/0411146 A1 | 12/2020 | Mcewing et al. |
| 2021/0019374 A1 | 1/2021 | Donaldson et al. |
| 2021/0027870 A1 | 1/2021 | West |
| 2021/0141860 A1 | 5/2021 | Karagiannis et al. |
| 2021/0174164 A1 | 6/2021 | Hsieh et al. |
| 2021/0209095 A1 | 7/2021 | Gallant |
| 2021/0241204 A1 | 8/2021 | Stein |
| 2021/0295822 A1* | 9/2021 | Tomkins ............ G06F 16/3338 |
| 2021/0319520 A1 | 10/2021 | Winters |
| 2021/0357187 A1 | 11/2021 | Clement et al. |
| 2021/0398077 A1 | 12/2021 | Lomurray et al. |
| 2022/0005566 A1 | 1/2022 | Lyman et al. |
| 2022/0035867 A1 | 2/2022 | Tambi et al. |
| 2022/0035869 A1 | 2/2022 | Beck et al. |
| 2022/0067841 A1 | 3/2022 | Hanson |
| 2022/0198573 A1 | 6/2022 | Brown et al. |
| 2022/0245162 A1 | 8/2022 | Wang et al. |
| 2022/0384052 A1 | 12/2022 | Gnanasambandam et al. |
| 2022/0405476 A1 | 12/2022 | Sar et al. |
| 2022/0405590 A1 | 12/2022 | Hebets |
| 2023/0138014 A1* | 5/2023 | Björkqvist ............ G06F 16/322 |
| | | 707/706 |
| 2023/0170092 A1 | 6/2023 | Moon et al. |
| 2023/0252338 A1 | 8/2023 | Ayyadevara et al. |

(56) References Cited

U.S. PATENT DOCUMENTS

| | | | |
|---|---|---|---|
| 2023/0283987 | A1 | 9/2023 | Cheng et al. |
| 2023/0289524 | A1 | 9/2023 | Prasad et al. |
| 2023/0359441 | A1 | 11/2023 | Duan et al. |
| 2023/0394040 | A1 | 12/2023 | Gupta et al. |
| 2023/0409614 | A1* | 12/2023 | Hamilton ............ G06F 16/9024 |
| 2024/0054326 | A1 | 2/2024 | Dave et al. |
| 2024/0248901 | A1* | 7/2024 | Krishnan .............. G06F 16/248 |
| 2024/0265431 | A1 | 8/2024 | Jimnez et al. |
| 2024/0386330 | A1 | 11/2024 | Ajmera et al. |

FOREIGN PATENT DOCUMENTS

| | | | |
|---|---|---|---|
| CA | 2841006 | A1 | 1/2013 |
| CN | 103329135 | A | 9/2013 |
| CN | 107665217 | A | 2/2018 |
| CN | 108304439 | B | 7/2021 |
| EP | 2622568 | A1 | 8/2013 |
| EP | 2710503 | A1 | 3/2014 |
| EP | 2729912 | A1 | 5/2014 |
| EP | 3156949 | A2 * | 4/2017 ......... G06F 16/2455 |
| IN | 201941028487 | A | 1/2021 |
| WO | 2012/050969 | A1 | 4/2012 |
| WO | 2012/156374 | A1 | 11/2012 |
| WO | 2013/004706 | A1 | 1/2013 |
| WO | 2014/087252 | A2 | 6/2014 |
| WO | 2023/278037 | A1 | 1/2023 |

OTHER PUBLICATIONS

Bao, et al., "Medical Code Prediction via Capsule Networks and ICD Knowledge", BMC Medical Informatics and Decision Making, vol. 21 (Suppl. 2):55, Jul. 30, 2021, (12 pages), doi.org/10.1186/s12911-021-01426-9.

Chapelle, Olivier et al. "A Dynamic Bayesian Network Click Model For Web Search Ranking," In Proceedings of the 18th International Conference On World Wide Web, Apr. 20, 2009, pp. 1-10, Madrid, Spain, available online at https://citeseerx.ist.psu.edu/viewdoc/download?doi=10.1.1.180.337&rep=rep1&type=pdf.

Clinical Management Guidelines for Obstetrician-Gynecologists, The American College Of Obstetricians and Gynecologists Practice Bulletin, No. 109, Dec. 2009, pp. 1-12.

Dao, Tien Tuan et al. "Knowledge-Based Personalized Search Engine For The Web-Based Human Musculoskeletal System Resources (HMSR) In Biomechanics," Journal of Biomedical Informatics, vol. 46, pp. 160-173, Feb. 1, 2013, (ePub: Nov. 10, 2012), DOI: 10.1016/j.jbi.2012.11.001.

Galli, Keith. Galli K. "High-Performance Intent Classification In Sparse Supervised Data Conditions," Doctoral Dissertation, Massachusetts Institute of Technology, Jun. 2019, (62 pages), available online: https://dspace.mit.edu/bitstream/handle/1721.1/123200/1128822757-MIT.pdf?sequence=1&isAllowed=y.

Gupta, Jai et al. "Personalized Online Spell Correction For Personal Search," In Proceedings of the 2019 World Wide Web Conference (WWW'19), May 13-17, 2019, (7 pages), DOI: 10.1145/3308558.3313706.

Hwang, Sewoong et al. "Toward A Chatbot For Financial Sustainability," Sustainability, vol. 13, No. 6:3173, Mar. 13, 2021, pp. 1-18, DOI: 10.3390/su13063173.

International Search Report and Written Opinion for International Application No. PCT/US2023/015396, dated Jun. 19, 2023, (13 pages), European Patent Office, Rijswijk, Netherlands.

Lemoine, Julien, et al., "Predictive Search and Autocomplete", Algolia Blog, (14 pages), Dec. 6, 2022, Retrieved from the Internet https://web.archive.org/web/20221206165729/https://www.algolia.com/blog/ai/predictive-search-and-autocomplete/.

Li, Jianqiang et al. "Diversity-Aware Retrieval Of Medical Records," Computers In Industry, vol. 29, pp. 81-91, May 2015, DOI: http://dx.doi.org/10.1016/j.compind.2014.09.004.

McCreadie, Richard et al. "A Study of Personalised Medical Literature Search," In International Conference of the Cross-Language Evaluation Forum for European Languages, Sep. 15, 2014, pp. 74-85, Springer, Cham, DOI: 10.1007/978-3-319-11382-1_8.

Miller, Alissa S. et al. "Improving Stage Of Change In An Employee Wellness Program," Workplace Health & Safety, vol. 67, No. 8, pp. 381-290, Aug. 2019, DOI: 10.1177/2165079919838291.

Momma, Michinari et al. "Multi-Objective Relevance Ranking," In Proceedings of the SIGIR 2019 eCom Workshop, Jul. 2019, (8 pages), Paris, France, DOI: https://assets.amazon.science/6f/7f/a34aac77415ead5d4d518d5b1801/multi-objective-relevance-ranking.pdf.

Non-Final Rejection Mailed on Feb. 26, 2024 for U.S. Appl. No. 17/971,491, 11 page(s).

Non-Final Rejection Mailed on Mar. 13, 2024 for U.S. Appl. No. 17/934,688, 20 page(s).

Perrault, Evan K. et al. "Employees' Refusals To Participate In An Employer-Sponsored Wellness Program: Barriers and Benefits To Engagement," Compensation & Benefits Review, vol. 52, No. 1, p. 8-18, Jan. 2020, DOI: 10.1177/0886368719899209.

Sun, Xu et al. "Feature-Frequency-Adaptive On-Line Training For Fast and Accurate Natural Language Processing," Computational Linguistic, vol. 40, No. 3, Sep. 1, 2014, pp. 563-586.

U.S. Provisional Patent Application, "Automated Health Data Acquisition, Processing And Communication System", Unpublished (filing date Nov. 30, 2012), (Peter Ohnemus, Inventor), 98 pages, U.S.A., U.S. Appl. No. 61/732,203.

U.S. Provisional Patent Application, "Health Data Acquisition, Processing and Communication System", Unpublished (filing date Jun. 9, 2011), (Peter Ohnemus, Inventor), 50 pages, U.S.A., U.S. Appl. No. 61/495,247.

U.S. Provisional Patent Application, "Health Data Acquisition, Processing and Communication System", Unpublished (filing date Sep. 29, 2010), (Peter Ohnemus, Inventor), 31 pages, U.S.A., U.S. Appl. No. 61/387,906.

U.S. Provisional Patent Application, "System And Method For Personal Energy Expenditure Analyses", Unpublished (filing date May 16, 2011), (Peter Ohnemus, Inventor), 35 pages, U.S.A., U.S. Appl. No. 61/486,658.

Wu, Qiang et al. "Adapting Boosting For Information Retrieval Measures," Learning To Rank For Information Retrieval, vol. 13, pp. 254-270, Jun. 2010, DOI: https://citeseerx.ist.psu.edu/viewdoc/download?doi=10.1.1.157.5117&rep=rep1&type=pdf.

Yadav, Nishant et al. "Session Aware Query Auto Completion Using Extreme Multi-Label Ranking," arXiv Preprint arXiv:2012.07654v2 [cs.IR], Jun. 7, 2021, (10 pages), available online: https://assets.amazon.science/5e/76/6ebacfc240e1a58b69a6f5347833/session-aware-query-auto-completion-using-extreme-multi-label-ranking.pdf.

Final Rejection Mailed on Mar. 17, 2025 for U.S. Appl. No. 18/520,662, 12 page(s).

Final Rejection Mailed on Sep. 13, 2024 for U.S. Appl. No. 17/934,688, 20 page(s).

Non-Final Rejection Mailed on Feb. 4, 2025 for U.S. Appl. No. 18/500,664, 40 page(s).

Non-Final Rejection Mailed on Feb. 10, 2025 for U.S. Appl. No. 17/934,688, 24 page(s).

Non-Final Rejection Mailed on Sep. 10, 2024 for U.S. Appl. No. 18/520,662, 17 page(s).

Non-Final Rejection Mailed on Sep. 20, 2024 for U.S. Appl. No. 18/047,209, 46 page(s).

Notice of Allowance and Fees Due (PTOL-85) Mailed on Sep. 12, 2024 for U.S. Appl. No. 18/484,943, 4 page(s).

Notice of Allowance and Fees Due (PTOL-85) Mailed on Sep. 26, 2024 for U.S. Appl. No. 18/416,276, 10 page(s).

"Semantic Textual Similarity," SBERT.net, (2 pages), (2024), [retrieved from the Internet Sep. 13, 2024] <URL: https://www.sbert.net/examples/training/sts/README.html>.

Alla, Samhita. "A Guide To Bidirectional RNNs With Keras," Paperspace Blog, (2020), (11 pages), (article, online), [retrieved from the Internet Sep. 13, 2024] <URL: https://blog.paperspace.com/bidirectional-rnn-keras/#:~:text=A%20Bidirectional%20RNN%20is%20a,the%20beginning%20of%20a%20sequence>.

Bern, Erik. "Spotify/Annoy: Approximate Nearest Neighbors In C++/Python Optimized For Memory Usage and Loading/Saving To

(56) References Cited

OTHER PUBLICATIONS

Disk," GitHub, Apr. 10, 2023, (8 pages), [retrieved from the Internet Sep. 13, 2024] <URL: https://github.com/spotify/annoy>.
Briggs, James. "BERT For Next Sentence Prediction," Towards Data Science, May 25, 2021, (7 pages), (article, online) [retrieved from the Internet Sep. 13, 2024] <URL: https://towardsdatascience.com/bert-for-next-sentence-prediction-466b67f8226f>.
Coates, Dustin. "How NLP & NLU Work For Semantic Search," Search Engine Journal, Apr. 25, 2022, (15 pages), [retrieved from the Internet Sep. 11, 2024] <URL: https://www.searchenginejournal.com/nlp-nlu-semantic-search/444694/>.
Corrected Notice of Allowance and Fees Due (PTOL-85), Sep. 12, 2024, U.S. Appl. No. 18/484,943, (4 pages).
Doshi, Sanket. "Skip-Gram: NLP Context Words Prediction Algorithm," Towards Data Science, Mar. 16, 2019, (12 pages), (article, online), [retrieved from the Internet Sep. 13, 2024] <URL: https://towardsdatascience.com/skip-gram-nlp-context-words-prediction-algorithm-5bbf34f84e0c>.
Final Office Action for U.S. Appl. No. 17/934,688, dated Sep. 13, 2024, (20 pages), U.S. Patent and Trademark Office, US.
NonFinal Office Action for U.S. Appl. No. 18/520,662, filed Sep. 10, 2024, (17 pages), U.S. Patent and Trademark Office, US.
Notice of Allowance and Fees Due (PTOL-85) Mailed on Aug. 23, 2024 for U.S. Appl. No. 18/484,943, 14 page(s).
Yan, et al., "A Survey of Automated International Classification of Diseases Coding: Development, Challenges, and Applications", Intelligent Medicine, vol. 2, pp. 161-173, Mar. 11, 2022, https://doi.org/10.1016/j.imed.2022.03.003.
Advisory Action (PTOL-303) Mailed on May 28, 2025 for U.S. Appl. No. 18/520,662, 3 page(s).
Final Rejection Mailed on Apr. 24, 2025 for U.S. Appl. No. 18/047,209, 50 page(s).
Final Rejection Mailed on Jul. 8, 2025 for U.S. Appl. No. 18/500,664, 21 page(s).
Gupta, Prabhakar , "A Context-Sensitive Real-Time Spell Checker with Language Adaptability", IEEE, (Year: 2020), 7 pages.
Hienert, et al., "A Novel Combined Term Suggestion Service for Domain-Specific Digital Libraries", 12 pages, (Year: 2011).
Jalali, et al., "The Effect of Using Domain Specific Ontologies in Query Expansion in Medical Field", IEEE, (Year: 2008), 5 pages.
Non-Final Rejection Mailed on Jun. 16, 2025 for U.S. Appl. No. 18/520,662, 11 page(s).
Non-Final Rejection Mailed on Jun. 17, 2025 for U.S. Appl. No. 18/434,959, 15 page(s).
Non-Final Rejection Mailed on May 8, 2025 for U.S. Appl. No. 18/583,102, 18 page(s).
Notice of Allowance and Fees Due (PTOL-85) Mailed on Jul. 9, 2025 for U.S. Appl. No. 17/934,688, 20 page(s).
Soualmia, et al., "The Effect of Using Domain Specific Ontologies in Query Expansion in Medical Field", BMC Bioinformatics, vol. 13, suppl. 14, (15 pages), 2012.
Final Rejection Mailed on Oct. 22, 2025 for U.S. Appl. No. 18/583,102, 21 page(s).
Non-Final Rejection Mailed on Nov. 3, 2025 for U.S. Appl. No. 18/047,209, 34 page(s).
Non-Final Rejection Mailed on Oct. 28, 2025 for U.S. Appl. No. 18/500,664, 22 page(s).
Non-Final Rejection Mailed on Sep. 17, 2025 for U.S. Appl. No. 18/527,910, 21 page(s).
Notice of Allowance and Fees Due (PTOL-85) Mailed on Aug. 8, 2025 for U.S. Appl. No. 18/980,819, 10 page (s).
Final Rejection Mailed on Dec. 2, 2025 for U.S. Appl. No. 18/434,959, 30 page(s).
Final Rejection Mailed on Dec. 17, 2025 for U.S. Appl. No. 18/520,662, 12 page(s).

\* cited by examiner

MULTI-CHANNEL SEARCH AND AGGREGATED SCORING TECHNIQUES FOR COMPLEX SEARCH DOMAINS

CROSS-REFERENCE TO RELATED APPLICATIONS

This application claims the benefit of U.S. Provisional Application No. 63/578,461, entitled "Multi-Modal, Multi-Channel Search," and filed Aug. 24, 2023, the entire contents of which are hereby incorporated by reference.

BACKGROUND

Various embodiments of the present disclosure address technical challenges related to search query resolutions generally and, more specifically, for generating comprehensive query resolutions for complex search domains. Traditionally, query resolutions are retrieved using basic keyword searching techniques on limited search result features, such as provider names, addresses, specialties, and/or the like for a clinical domain. In some cases, these searches may be augmented with primitive structured filters, such as provider spoken languages, distances, and/or the like, to narrow down returned results. In such cases, a user is required to fill in a lengthy form (e.g., one or more input fields, etc.) to complete a search query, and very often, the search is not effective because the user lacks sufficient knowledge for a particular search domain (e.g., a user may not know what clinical specialty is needed for a condition, etc.). By way of example, in a clinical domain, a user's child may experience stomach pain for one week causing a user to look for a provider to treat the condition. However, the user may not understand the condition or provider specialties enough to search or recognize a correct provider. As such, the user may enter a search query indicative (e.g., including identifiers, such as international classification of diseases (ICD) codes, textual descriptions of a condition, etc.) of the condition, such as the natural language text sequence "my kid's stomach hurts all the time" and constrain the results to providers within 50 miles from the user's home. Such a search query may result in null results due to a lack of keyword matches between provider features and the keywords "stomach" and "hurts." As shown by the example, traditional searching techniques are limited to user' with sufficient knowledge of a search domain.

Various embodiments of the present disclosure make important contributions to traditional search query resolution techniques by addressing this technical challenge, among others.

BRIEF SUMMARY

Various embodiments of the present disclosure provide multi-modal and multi-channel search solutions to intelligently enhance search queries and aggregate multi-channel results for a search query that enable comprehensive query resolutions for generic search results. Using some of the techniques of the present disclosure, a search query may be transformed into multiple complementary representations, such as a keyword and embedding representation, to measure a syntactic and sematic similarity between the search query and features across multiple domain channels of a search domain. These measures may be aggregated to identify multi-channel features that correspond to the search query, which may be used to identify and augment a final search resolution. In this way, some of the techniques of the present disclosure provide searching capabilities with deeper semantic and contextual understanding of search queries beyond literal words (e.g., interpreting "stomach hurts" as "stomach pain" or more general, "upper abdominal pain"). In addition, or alternatively, the search capability may match query intents with proper query resolutions (e.g., matching condition "stomach pain" with specialty "gastroenterology"), while adopting user preferences (e.g., location, spoken languages) and aggregating and disseminating results from multiple sources (e.g., from provider profiles, claim data, specialty information) in an efficient manner.

In some embodiments, a computer-implemented method includes generating, by one or more processors, a keyword representation and an embedding representation for a search query; generating, by the one or more processors, a plurality of keyword similarity scores between the keyword representation and a plurality of source text attributes from a domain channel; generating, by the one or more processors, a plurality of embedding similarity scores between the embedding representation and a plurality of source embedding attributes from the domain channel; generating, by the one or more processors, an intermediate query resolution for the search query based on a plurality of aggregated similarity scores each including a weighted combination of (i) a keyword similarity score of the plurality of keyword similarity scores and (ii) an embedding similarity score of the plurality of embedding similarity scores; and providing, by the one or more processors, data indicative of a query resolution based on the intermediate query resolution.

In some embodiments, a computing system includes memory and one or more processors communicatively coupled to the memory, the one or more processors are configured to generate a keyword representation and an embedding representation for a search query; generate a plurality of keyword similarity scores between the keyword representation and a plurality of source text attributes from a domain channel; generate a plurality of embedding similarity scores between the embedding representation and a plurality of source embedding attributes from the domain channel; generate an intermediate query resolution for the search query based on a plurality of aggregated similarity scores each including a weighted combination of (i) a keyword similarity score of the plurality of keyword similarity scores and (ii) an embedding similarity score of the plurality of embedding similarity scores; and provide data indicative of a query resolution based on the intermediate query resolution.

In some examples, one or more non-transitory computer-readable storage media includes instructions that, when executed by one or more processors, cause the one or more processors to generate a keyword representation and an embedding representation for a search query; generate a plurality of keyword similarity scores between the keyword representation and a plurality of source text attributes from a domain channel; generate a plurality of embedding similarity scores between the embedding representation and a plurality of source embedding attributes from the domain channel; generate an intermediate query resolution for the search query based on a plurality of aggregated similarity scores each including a weighted combination of (i) a keyword similarity score of the plurality of keyword similarity scores and (ii) an embedding similarity score of the plurality of embedding similarity scores; and provide data indicative of a query resolution based on the intermediate query resolution.

DETAILED DESCRIPTION

Figure 1:
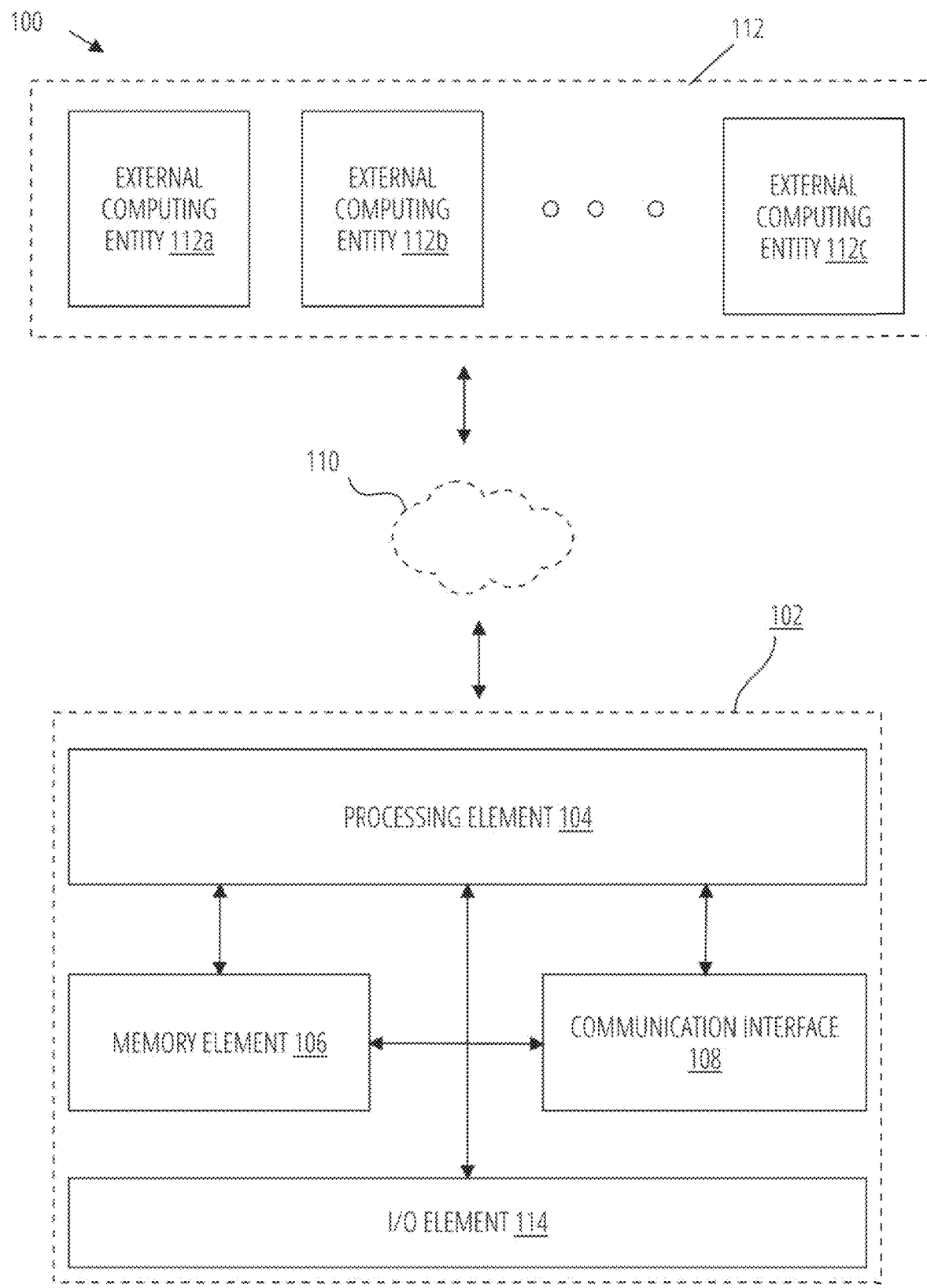
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not indicate being based only on or based solely on the referenced element or elements unless so indicated. Like numbers refer to like elements throughout. Moreover, while certain embodiments of the present disclosure are described with reference to predictive data analysis, one of ordinary skills in the art will recognize that the disclosed concepts may be used to perform other types of data analysis.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like). A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 illustrates an example computing system 100 in accordance with one or more embodiments of the present disclosure. The computing system 100 may include a predictive computing entity 102 and/or one or more external computing entities 112a-c communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop (s), server(s), cloud computing platform(s), and/or the like. In some example embodiments, the predictive computing entity 102 may be configured to receive and/or transmit one or more datasets, objects, and/or the like from and/or to the external computing entities 112a-c to perform one or more steps/operations of one or more techniques (e.g., multi-modal matching techniques, query resolution techniques, and/or the like) described herein.

The external computing entities 112a-c, for example, may include and/or be associated with one or more entities that may be configured to receive, store, manage, and/or facilitate datasets, such as the domain knowledge datastore, and/or the like. The external computing entities 112a-c may provide such datasets, and/or the like to the predictive computing entity 102 which may leverage the datasets to evaluate a search query. In some examples, the datasets may include an aggregation of data from across the external computing entities 112a-c into one or more aggregated datasets. The external computing entities 112a-c, for example, may be associated with one or more data repositories, cloud platforms, compute nodes, organizations, and/or the like, that may be individually and/or collectively leveraged by the predictive computing entity 102 to obtain and aggregate data for a search domain.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like, may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112a-c, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
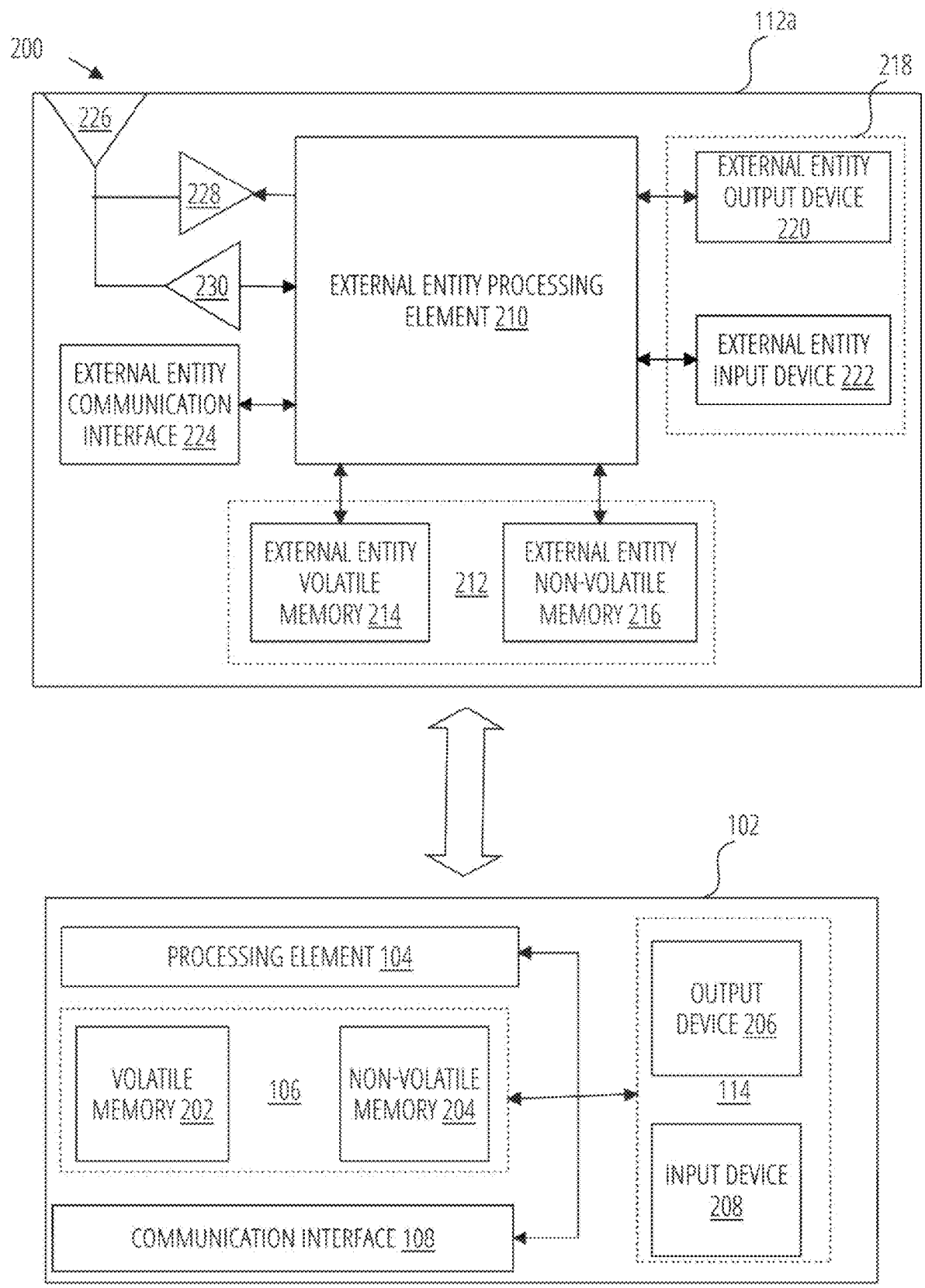
FIG. 2 is a schematic diagram showing a system computing architecture in accordance with one or more embodiments of the present disclosure.

FIG. 2 is a schematic diagram showing a system computing architecture 200 in accordance with some embodiments discussed herein. In some embodiments, the system computing architecture 200 may include the predictive computing entity 102 and/or the external computing entity 112a of the computing system 100. The predictive computing entity 102 and/or the external computing entity 112a may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more steps/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

The predictive computing entity 102 may be embodied by a computer program product which includes non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112a. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112a may include an external entity processing element 210, an external entity memory element 212, an external entity communication interface 224, and/or one or more external entity I/O elements 218 that communicate within the external computing entity 112a via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112a may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112a may be capable of operating with one or more air interface standards, communication protocols, modulation types, and access types. More particularly, the external computing entity 112a may operate in accordance with any of a number of wireless communication standards and protocols, such as those described above with regard to the predictive computing entity 102.

Via these communication standards and protocols, the external computing entity 112a may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112a may also download changes, add-ons, and updates, for instance, to its firmware, software (e.g., including executable instructions, applications, program modules), operating system, and/or the like.

According to one embodiment, the external computing entity 112a may include location determining embodiments, devices, modules, functionalities, and/or the like. For example, the external computing entity 112a may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112a in connection with a variety of other systems, including cellular towers, Wi-Fi access points, and/or the like. Similarly, the external computing entity 112a may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112a to interact with and/or cause the display, announcement, and/or the like of information/data to a user. The user input interface may include any of a number of input devices or interfaces allowing the external computing entity 112a to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112a and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. EXAMPLES OF CERTAIN TERMS

In some embodiments, the term "search query" refers to a data entity that describes a text-based search query for a search domain. A search query, for example, may include a structured and/or natural language sequence of text (e.g., one or more alphanumeric characters, symbols, etc.). In some examples, the search query may include user input, such as text input and/or text generated from one or more audio, tactile, and/or like inputs. In some examples, a search query may include a natural language sequence of text. In some examples, the natural language sequence of text may be associated with one or more contextual query attributes. The contextual query attributes, for example, may include a location attribute (e.g., a global positioning system (GPS) position, a latitude/longitude, etc.), one or more structured filters (e.g., selected categories, etc.), and/or the like. In some examples, the search query may include (i) a natural language sequence of text that expresses a question, preference, and/or the like and/or (ii) one or more contextual query attributes for constraining a result for the natural language sequence of text.

In some embodiments, the search query is based on a search domain. For example, a search query for a clinical domain may include a natural language sequence of text to express a description of a medical condition and/or contextual query attributes, such as a location, member network, and/or the like that may constrain a recommendation for addressing the medical condition for a user. In some examples, a search query for a particular search domain may include one or more characteristics. As some examples, a search query may include a full word (e.g., "pediatrics" in a clinical domain) or a partial word (e.g., "pedi") text. In addition, or alternatively, the search queries may correspond to one or more different topics within a search domain, such as (i) clinical conditions (e.g., adhd, etc.), (ii) clinical specialties (e.g., urgent care, etc.), and (iii) clinical services (eye exam, etc.) in a clinical domain. In some examples, a search query may be constrained by factors that correspond to the particular search domain, such as network plans, languages spoken by healthcare providers, a user's ability to travel for treatment, among other examples for a clinical domain. By way of example, keeping with the clinical example, a user may consider traveling 100 miles to have a foot surgery but would not want their primary care provider to be more than 5 miles from their location.

In some embodiments, a search query is input to and/or processed by a search engine. For example, a user may be allowed to type in full words (e.g., "pediatrics gastroenterology" in a clinical domain), partial words (e.g., "joh") that may be autocompleted as best matched word(s) (e.g., "john", "johnathan"), and/or the like into a search interface of the search engine. In response to the search query, the search engine may generate a plurality of comprehensive search results. For instance, using some of the techniques of the present disclosure, one or more multi-modal search functions may be applied to the search query (e.g., keyword search on provider profiles (e.g., names, addresses, IDs, etc.), topic search, etc.) to extract semantic and contextual information from the search query and intelligently match the search query with comprehensive query result data objects. In some examples, search/typeahead functions may be used in combination with structured filters (e.g., location, provider network) to accommodate user preferences.

In some embodiments, the term "expanded query" refers to a data entity that describes a search query that is augmented with contextual information for a search domain. An expanded query, for example, may include a structured and/or natural language sequence of text. In some examples, the expanded query may be generated from a search query using a language model. For example, a language model may be applied to the search query to interpret the search query and generate contextual information to augment the natural language sequence of text of the search query. In some examples, as described herein, a language model may be trained using a text data for a particular search domain to generate contextual information that is relevant for the search domain. For instance, in a clinical domain, a search query for a term "sickle cell," which may be a rare genetic disorder in blood cells, may be expanded to "sickle cell disease is a genetic disorder that affects the red blood cells" to provide semantic and syntactic information to improve the similarity between the search query and one or more intermediate or final search results for the search query. By way of example, the added phrases "genetic disorder," "red blood cells," and/or the like may improve similarities with proper specialties, such as a "hematologist" that may treat the originally provided search query, "sickle cell."

In some embodiments, the term "language model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). A language model may include one or more machine learning models configured, trained (e.g., jointly, separately, etc.), and/or the like to generate contextual information for a search query. A language model may include one or more of any type of machine learning model including one or more supervised, unsupervised, semi-supervised, reinforcement learning models, and/or the like. In some examples, a language model may include multiple models configured to perform one or more different stages of a generative language process.

In some embodiments, a language model is a generative machine learning model, such as a large language model (LLM). For example, a language model may include an LLM configured to generate contextual information for a search query that is grounded by a particular search domain. By way of example, the LLM may be trained using text data, such as source text attributes, for a search domain. The text data, for example, may be aggregated by a domain knowledge datastore configured for a search domain.

In some embodiments, the term "domain knowledge datastore" refers to a dataset for a search domain. For example, a domain knowledge datastore may include a comprehensive dataset that aggregates data from a plurality of disparate data sources associated with a search domain. In some examples, the aggregated data may be stored in one or more different verticals to enable targeted retrieval and ingestion operations for accessing data. For example, the domain knowledge datastore may include source data that is associated with a plurality of different sub-domains within a search domain. In some examples, the source data may be ingested by a search engine through one or more different channels tailored to each of the sub-domains.

In some embodiment, the search domain is associated with a plurality of potential query results. The potential query results may be represented within the domain knowledge datastore as query result data objects. The query result data objects may include a plurality of source features that describe one or more characteristics of the query result data objects. Each of the source features may include one or more searchable attributes, such as source text attributes that may be searched using keyword matching techniques, source embedding attributes that may be searched using embedding matching techniques, and/or the like. In some examples, the plurality of source features for a query result data object may be divided into one or more different channels tailored to each of the sub-domains of the search domain to enable a multi-modal searching across multiple different topics expressed by a particular search domain.

In some embodiments, the domain knowledge datastore includes different sets of data for different search domains. For example, in a clinical domain, a domain knowledge datastore may include a plurality of query result data objects that correspond to one or more healthcare profiles for one or more healthcare providers within one or more different healthcare networks. For examples, the domain knowledge datastore may augment institution provider profiles with clinical knowledge, machine learning techniques, and/or the like, such that each source feature of a healthcare provider profile is searchable using natural language. In some examples, the augmented data may be ingested as channels within a clinical search engine.

In some embodiments, the domain knowledge datastore includes one or more models, such as the language model, a machine learning embedding model, and/or the like. The machine learning embedding model, for example, may be leveraged to generate a plurality of source embedding attributes to augment the features of the domain knowledge datastore. In some examples, the models may be accessible (e.g., through machine learning service application programming interfaces (APIs), etc.) to process a search query as described herein.

In some examples, the domain knowledge datastore may include, for a clinical domain, a plurality of institutional provider profiles, including provider names, addresses, healthcare provider taxonomy codes (e.g., "207KA0200X"), network IDs, geocode (latitude/longitude), and/or miscellaneous information such as provider spoken languages, and/or the like. In addition, or alternatively, the domain knowledge datastore may include medical claim data including medical codes, such as ICD codes, current procedural terminology (CPT) codes, and/or the like, submitted by a provider in the last N months (default N=12). In addition, or alternatively, the domain knowledge datastore may include public clinical knowledge resources, such as text descriptions of taxonomies, ICD, and CPT codes, and/or the like. For example, one description for the taxonomy code "207KA0200X" may be "a physician who specializes in the diagnosis, treatment, and management of allergies." In addition, or alternatively, the domain knowledge datastore may include one or more lists of manually crafted keywords/phrases clinically associated with each taxonomy code. For example, one key phrase related to "207KA0200X" may be "skin rash", which is a common symptom of allergy. In addition, or alternatively, the domain knowledge datastore may include a sentence-transformer based health informatics text-embedding model fine-tuned to extract semantic and context information from, and transform a text sequence (e.g., a taxonomy description) into a D-dimension (default D=384) numeric vector. In addition, or alternatively, the domain knowledge datastore may include an LLM, such as the language model, that serves as a "library of knowledge" for interpreting queries. In addition, or alternatively, the domain knowledge datastore may include one or more enhanced taxonomies that correlated one or more disparate sets of data, such as correlating ICD codes with CPT codes, and/or the like.

In some embodiments, the term "query result data object" refers to a data entity that describes a potential search result for a search domain. A query result data object, for example, may be indicative (e.g., include an entity identifier, textual description, etc.) of an entity that is associated with one or more source features from the domain knowledge datastore. By way of example, a query result data object may include a profile for an entity that includes a plurality of source features corresponding to the entity. The entity may depend on the search domain. As one example, in a clinical domain, an entity may be a healthcare provider (e.g., facility, practitioner, medical group, etc.) and the query result data object may include a provider profile identifying a plurality of source features corresponding to the healthcare provider. In some examples, the plurality of source features for a particular query result data object may be distributed across a plurality of different information channels.

In some embodiments, the term "source feature" refers to a data entity that describes a characteristic corresponding to one or more potential search results of a search domain. A source feature, for example, may be indicative (e.g., include an attribute identifier, textual description, etc.) of an attribute that may be associated with one or more query result data objects. For instance, a source feature may include an object-specific source feature that correspond to a single query result data object (e.g., a unique name, precise location, etc.). In addition, or alternatively, a source feature may include an object-generic source feature (e.g., a general location, a specialty, an activity frequency, etc.). In some examples, the object-generic source features (and/or the object-specific source features) may be based on a search domain. By way of example, a clinical domain may include a plurality of source features that describe one or more taxonomy codes (e.g., clinical specialties, etc.), assessment codes (e.g., ICD codes, etc.), intervention codes (e.g., CPT codes, etc.), and/or the like that may associated with one or more of a plurality of query result data objects within a search domain.

In some embodiments, the term "source text attribute" refers to an attribute of a source feature represented as one or more characters (e.g., alphanumeric, numeric, alphabetic, etc.). For example, a source text attribute may include a numeric, alpha-numeric, and/or the like code (e.g., taxonomy code, ICD code, CPT code, etc.) that corresponds to a source feature. In addition, or alternatively, a source text attribute may include a textual description that corresponds to the source feature (e.g., a taxonomy description, code description, etc.).

In some embodiments, the term "source embedding attribute" refers to an attribute of a source feature represented as a numerical vector. For example, a source embedding attribute may include an embedded representation of a source text attribute and/or contextual information for the source text attribute. In some examples, a source embedding attribute may be generated, using a machine learning embedding model, for one or more of the source features to complement a source text attribute in a multi-modal search environment.

In some embodiments, the term "machine learning embedding model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). A machine learning embedding model may include one or more machine learning models configured, trained (e.g., jointly, separately, etc.), and/or the like to encode textual data into one or more embeddings. A machine learning embedding model may include one or more of any type of machine learning model including one or more supervised, unsupervised, semi-supervised, reinforcement learning models, and/or the like. In some examples, a machine learning embedding model may include multiple models configured to perform one or more different stages of an embedding process.

In some embodiments, a machine learning embedding model is trained using one or more supervised training techniques. In some examples, a machine learning embedding model may be trained to factorize one or more inputs, such as one or more text strings, to generate an embedded vector. In some examples, a machine learning embedding model may be trained such that the model's latent space is representative of certain semantic domains/contexts, such as a clinical domain. For example, a machine learning embedding model may be trained to generate embeddings representative of one or more learned (and/or prescribed, etc.) relationships between one or more words, phrases, and/or sentences. By way of example, a machine learning embedding model may represent a semantic meaning of a word and/or sentence differently in relation to other words and/or sentences, and/or the like. The machine learning embedding model may include any type of embedding model finetuned on information for a particular search domain. By way of example, a machine learning embedding model may include one or more of SBERT, ClinicalBERT, BERT, Word2Vec, GloVe, Doc2Vec, InferSent, Universal Sentence Encoder, and/or the like. A machine learning embedding model may be finetuned on the domain knowledge datastore, a plurality of historical search queries, and/or the like.

In some embodiments, the term "domain channel" refers to a dataset of source features that correspond to a sub-domain within a search domain. For example, a complex search domain may be divided into a plurality of sub-domains, each representing different channels of information that may be collectively and/or individually queried to generate a query resolution for a search query. Each of the plurality of sub-domains may be represented by a plurality of source features that correspond to a particular search topic within the complex search domain. According to some techniques of the present disclosure, a comprehensive search resolution may be generated by aggregating multi-channel search results across each of a plurality of domain channels corresponding to the respective sub-domains of the complex search domain. By way of example, some techniques of the present disclosure enable a single search query to reach multiple verticals (e.g., sub-domains such as provider profiles, specialties, services, etc.) through a federated application programming interface (API) that submits queries to and aggregates matched results from each of the domain channels asynchronously. In this manner, domain channel may be leveraged as an efficient approach to group results from verticals and provide a comprehensive response to a search query.

In some embodiments, a number and type of domain channels depends on the search domain. For example, in a clinical search domain, source data from provider records may be represented with two, three, four, five, etc. channels of information. By way of example, a domain channel may include five channels including a profile channel, an identifier channel, a taxonomy channel, an assessment channel, and intervention channel, and/or the like.

In some embodiments, the term "channel-specific feature" refers to a source feature of a domain channel. By way of example, a channel-specific feature may include a profile feature for a profile channel, an identifier feature for an identifier channel, a taxonomy feature for a taxonomy channel, an assessment feature for an assessment channel, an intervention feature for an intervention channel, and/or the like.

In some embodiments, the term "profile channel" refers to an example domain channel for a search domain. For example, in a clinical domain, a profile channel may include provider information such as a name, address, network identifiers, geo-location, and/or the like.

In some embodiments, the term "identifier channel" refers to an example domain channel for a search domain. For example, in a clinical domain, an identifier channel may include provider-related IDs, such as national provider IDs, enterprise provider IDs, and/or the like.

In some embodiments, the term "taxonomy channel" refers to an example domain channel for a search domain. For example, in a clinical domain, a taxonomy channel may include a plurality of taxonomy codes, textual descriptions, embedding vectors, and/or the like. In some examples, the taxonomy channel may capture a provider's specialty characteristics specified in the national practitioner data bank (NPDB).

In some embodiments, the term "assessment channel" refers to an example domain channel for a search domain. For example, in a clinical domain, an assessment channel may include ICD codes, textual descriptions, embedding vectors of ICD descriptions, and/or the like. In some examples, the assessment channel may capture clinical conditions a provider has treated based the claim information.

In some embodiments, the term "intervention channel" refers to an example domain channel for a search domain. For example, in a clinical domain, an intervention channel may include CPT codes, textual descriptions, embedding vectors of CPT descriptions, and/or the like. In some examples, the intervention channel captures clinical procedures a provider has performed based on the claim information.

In some embodiments, the term "keyword representation" refers to a text-based representation of a search query. For example, a keyword representation may include a plurality of text units from a textual sequence. The text units, for example, may include a plurality of keywords extracted (e.g., by a keyword extraction model, etc.) from the textual sequence. By way of example, a keyword representation may include the plurality of extracted keywords.

In some embodiments, the term "keyword similarity score" refers to a text-based measure of similarity between a search query and a source feature. For example, a keyword similarity score may include a numeric representation (e.g., a real number, probability, etc.) indicative (e.g., a measure representing, etc.) of a similarity between a search query and a source feature. The keyword similarity score, for example, may include a syntactic similarity measure between the keyword representation and a source text attribute of a source feature.

In some embodiments, the term "embedding representation" refers to a vector-based representation of a search query. For example, an embedding representation may include an embedded vector from a textual sequence associated with search query. The embedding representation, for example, may include an embedding vector (e.g., numeric vector, etc.) that captures a search query's semantic and contextual meaning. By way of example, an embedding representation may be generated by processing a search query with a machine learning embedding model.

In some embodiments, the term "embedding similarity score" refers to an embedding-based measure of similarity between a search query and a source feature. For example, an embedding similarity score may include a numeric representation (e.g., a real number, probability, etc.) indicative (e.g., a measure representing, etc.) of a similarity between a search query and a source feature. The embedding similarity score, for example, may include a semantic similarity measure between the embedding representation and a source embedding attribute of a source feature. The embedding similarity score may include any embedding distance calculation, such as cosine similarity scores, and/or the like, and/or any other embedding similarity comparison.

In some embodiments, the term "aggregated similarity score" refers to a measure of similarity between a search query and a source feature. For example, an aggregated similarity score may include a measure of similarity that is aggregated from one or more disparate similarity scores between a query and a source feature. In some examples, an aggregated similarity score may include a weighted sum, product, and/or the like of matching scores (e.g., keyword similarity scores, embedding similarity scores, etc.) for a source feature. By way of example, the keyword and embedding representations that match with a corresponding source feature within a domain channel may be leveraged to generate a plurality of complementary similarity scores, such as keyword and embedding similarity scores, for a source feature. The complementary similarity scores may be aggregated using a weighted sum, product, and/or the like to generate an aggregated similarity score that may be used as a final relevance score between a search query and a particular source feature and/or domain channel. In this way, keyword matching techniques may be leveraged to capture literal similarities, while matching on embeddings captures semantic and contextual similarities between a search query and a source feature. This unique combination takes advantage of both keyword search and embedding technologies to better capture relationships between multiple domain channels (e.g., clinical conditions, specialties, and services, etc. in a clinical domain) in a complex search domain.

In some embodiments, the term "intermediate query resolution" refers to a data entity that describes one or more source features corresponding to a search query. For example, an intermediate query resolution may include an output of a first stage of a multi-stage search process. The intermediate query resolution, for example, may identify a plurality of source features from one or more domain channels for a search query. In some examples, if selected by a user, a second stage of a multi-stage search process may be performed to generate a query resolution based on the source features identified by the intermediate query resolution.

In some embodiments, the term "query resolution" refers to a data entity that describes one or more query result data objects corresponding to a search query. For example, a query resolution may identify one or more query result data objects (and/or one or more source features thereof) for a search query. In some examples, a query resolution may include an output of a second stage of a multi-stage search process. A query resolution, for example, may identify one or more query result data objects for a search query based on a plurality of source features identified by an intermediate query resolution. By way of example, the query resolution may include one or more query result data objects that correspond to one or more source features (e.g., providers that may treat an identified condition, provide a service, practice in a specialty, etc.) identified from one or more of the domain channels of the search domain.

IV. OVERVIEW

Embodiments of the present disclosure presents combinations of multi-model, multi-channel, and multi-stage query resolution techniques that improve computer interpretation through various data and query processing operations. Traditional approaches for resolving queries rely on either keyword searching or semantic matching each of which are subject to several downsides as described herein. Unlike traditional approaches, some embodiments of the present disclosure enable the intelligent combination of both semantic and syntactic insights to generate holistic similarity scores between a search query and searchable results. For example, using some of the techniques of the present disclosure, a plurality of embedding similarity scores and keyword similarity scores may be generated and then aggregated to create aggregated similarity scores for a plurality of searchable features. These features may then be leveraged, through a multi-stage query resolution process, to generate a query resolution for a search query that is explainable, comprehensive, and tailored to the user's predicted intent behind the query. By doing so, some of the techniques of the present disclosure present an end-to-end technical solution for searching within complex, multi-faceted search domains that is adaptable to organizational web pages, mobile applications, or any other searching medium. In this respect, the computer interpretation techniques of the present disclosure may be practically applied to improve the performance of traditional query engines in any search domain.

In some embodiments of the present disclosure, the computer interpretation techniques may be applied through a multi-stage query resolution process.

In a first stage, multi-modal and/or multi-channel searching techniques may be leveraged to generate an intermediate output for a search query. The multi-modal and/or multi-channel searching techniques may leverage machine learning models trained on a domain knowledge datastore that is tailored to a specific search domain to generate insights relative to the particular domain. Moreover, the domain knowledge, and insights thereof, may divided into a plurality of domain channels such that an intermediate output may include information for each of a plurality of different potential topics related to a search query. In this way, unlike traditional query resolution techniques, an intermediate output may be derived from a combination of both textual and embedding insights across a plurality of channel-specific features associated with a search domain. This, in turn, enables the generation of comprehensive intermediate outputs that account for the words of a search query, while considering a deeper semantic and contextual understanding of the search query beyond the literal words (e.g., interpreting "stomach hurts" as "stomach pain" or more general, "upper abdominal pain"). By doing so, an intermediate output may match query intents with proper provider information (e.g., matching condition "stomach pain" with specialty "gastroenterology"), while adopting user preferences (e.g., location, spoken languages) and aggregating and disseminating results from multiple sources (e.g., from provider profiles, claim data, specialty information) in an efficient manner. Thus, the first stage of the multi-stage query resolution process presents a hybrid approach for topic searching that shows capabilities in understanding semantic and contextual meaning of user queries.

In a second stage, intermediate outputs may be leveraged to generate query resolutions that are interpretable, explainable, and comprehensively account for multiple topics (e.g., information channels) within a search domain. For instance, a multi-modal, multi-stage topic search may match query intents with proper query resolutions, such as provider information, and return relevant results in each topic (e.g., channel), such as clinical aspects (e.g., provider information, specialty information, etc.) in a clinical domain, of a respective search domain. While doing so, the query resolution may incorporate structured filters (e.g., geolocation, provider network, etc.) to accommodate user preferences. This may be accomplished by leveraging a federated API that may aggregate search results from multiple channels/stages of searchable information and deliver a comprehensive response to a search query efficiently.

Examples of technologically advantageous embodiments of the present disclosure include: (i) a domain knowledge datastore, including the manually crafted keywords/phrases clinically associated with specialties and a fine-tuned text embedding model that transforms a text sequence into embedding vectors, (ii) multi-stage searching techniques that match search queries with provider service experience characterized by healthcare provider taxonomies, ICDs, CPTs, and/or the like, (iii) a hybrid approach that combines keyword/typeahead searching with text embedding techniques to generate aggregated similarity insights, (iv) a federated API that leverages a multi-channel, multi-stage searching strategy to deliver a comprehensive response to a search query efficiently, (v) LLMs to interpret and expand queries, among other aspects of the present disclosure. Other technical improvements and advantages may be realized by one of ordinary skill in the art.

V. EXAMPLE SYSTEM OPERATIONS

As indicated, various embodiments of the present disclosure make important technical contributions to query resolution technology. In particular, systems and methods are disclosed herein that implement a multi-modal and multi-channel search resolution techniques to improve query comprehension and generate holistic query resolutions. Unlike traditional query resolution techniques, some of the techniques of the present disclosure combine semantic and syntactic similarity scores across a plurality of channels of information aggregated by a domain knowledge datastore. By doing so, search results may be generated that capture the underlying intent behind search queries in complex search domains. Meanwhile, by providing multi-channel information in response to a search, the techniques of the present disclosure may improve both the accuracy and interpretability of query resolutions.

Figure 3:
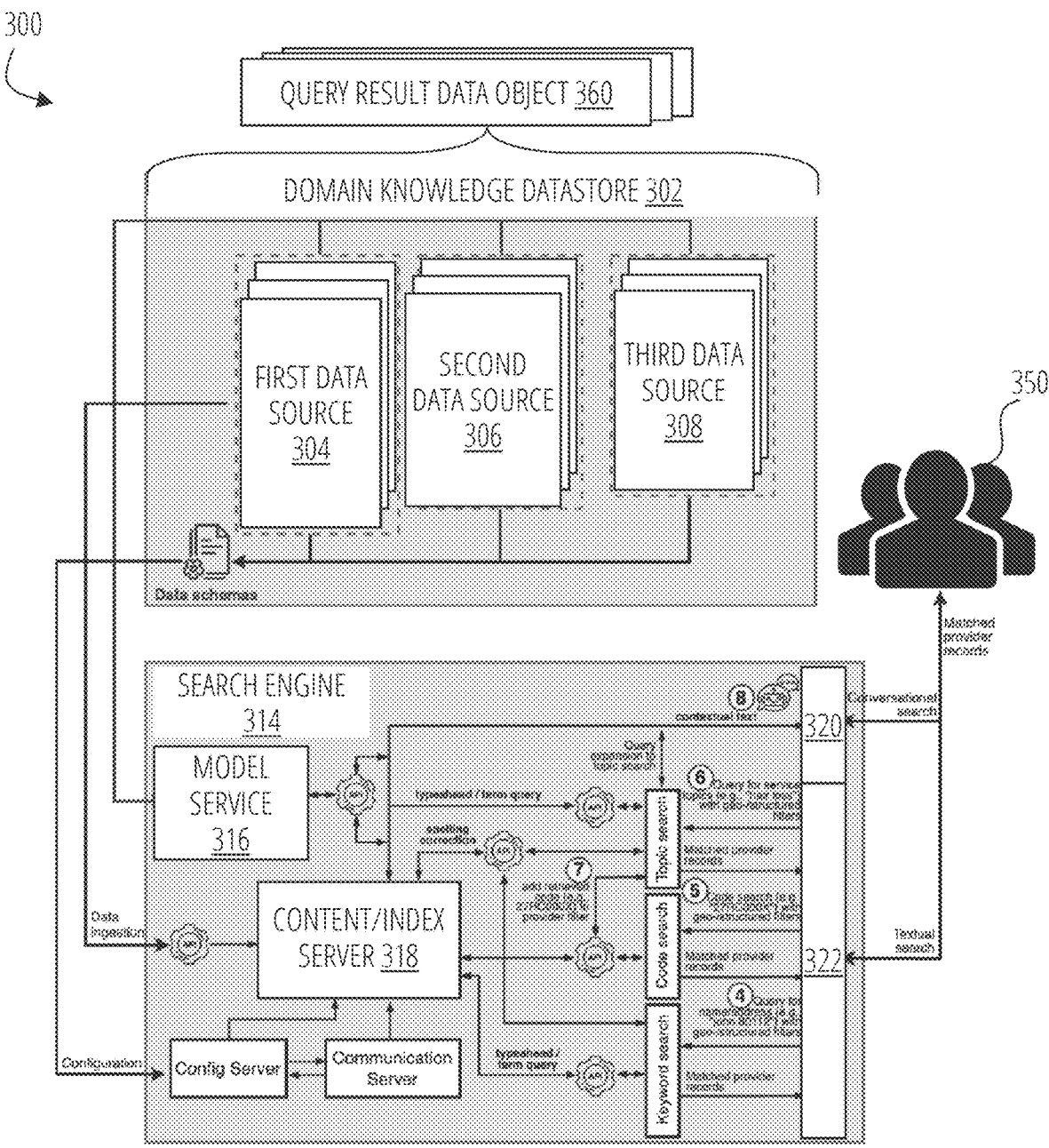
FIG. 3 is a system diagram showing an example query resolution system in accordance with some embodiments discussed herein.

FIG. 3 is a system diagram 300 showing an example query resolution system in accordance with some embodiments discussed herein. The system diagram 300 depicts a computing system, such as the computing system 100 described herein, that includes one or more communicatively connected computing entities including, for example, a domain knowledge datastore 302 and/or a search engine 314. In some examples, the domain knowledge datastore 302 and/or search engine 314 may independently and/or jointly receive a search query from a user and, in response to the search query, provide a comprehensive query resolution. By way of example, the search engine 314 may be configured to receive, via one or more interface APIs (e.g., conversational API, federated API, etc.), a search query from a user. The search engine 314 may leverage one or more multi-modal search techniques of the present disclosure to generate a comprehensive query resolution for the search query based on multi-channel information ingested from the domain knowledge datastore 302.

In some embodiments, the domain knowledge datastore 302 includes a computing entity that is configured to aggregate data for a search domain from a plurality of disparate data source, By way of example, the domain knowledge datastore 302 may include data from a first data source 304, a second data source 306, and third data source 308, and/or any number of addition data sources. The data sources may depend on the search domain. For example, the domain knowledge datastore 302 may be tailored to a search domain and may aggregate data from one or more data sources for the search domain. By of example, in a clinical domain, the data sources may be clinical in nature and may include, as examples, (i) a first data source 304 of clinical knowledge, such as clinical taxonomy descriptions, specialty keywords, code descriptions (e.g., ICD, ICPT code descriptions, etc.), and/or the like, (ii) a second data source 306 of medical claims information, such as medical codes (e.g., ICD, CPT codes, etc.), provider identifiers, service locations, and/or the like from historical medical claims, (iii) a third data source 308 of provider information, such as practitioner taxonomy codes, provider specialties, provider identifiers, provider address, and/or the like, among other clinically relevant data sources.

In some embodiments, the domain knowledge datastore 302 includes a comprehensive dataset for a search domain. For example, the domain knowledge datastore 302 may include a comprehensive dataset that aggregates data from a plurality of disparate data sources associated with the search domain. In some examples, the aggregated data may be stored in one or more different verticals to enable targeted retrieval and ingestion operations for accessing data. For example, the domain knowledge datastore 302 may include source data that is associated with a plurality of different sub-domains within the search domain. In some examples, the source data may be ingested by the search engine 314 through one or more different channels tailored to each of the sub-domains.

In some embodiment, the search domain is associated with a plurality of potential query results. The potential query results may be represented within the domain knowledge datastore 302 as query result data objects 360. The query result data objects 360 may include a plurality of source features that describe one or more characteristics of the query result data objects 360. The source features, for example, may be aggregated for each of the query result data objects 360 from a plurality of different data sources, such as the first data source 304, the second data source 306, the third data source 308, and/or the like. Each of the source features may include one or more searchable attributes, such as source text attributes that may be searched using keyword matching techniques, source embedding attributes that may be searched using embedding matching techniques, and/or the like. In some examples, the plurality of source features for the query result data objects 360 may be divided into one or more different channels tailored to each of the sub-domains of the search domain to enable a multi-modal searching across multiple different topics expressed by a particular search domain.

In some embodiments, the domain knowledge datastore 302 includes different sets of data for different search domains. For example, in a clinical domain, a domain knowledge datastore 302 may include a plurality of query result data objects 360 that correspond to one or more healthcare profiles for one or more healthcare providers within one or more different healthcare networks. For examples, the domain knowledge datastore 302 may augment institution provider profiles with clinical knowledge, machine learning techniques, and/or the like, such that each source feature of a healthcare provider profile is searchable using natural language and/or embeddings thereof. In some examples, the augmented data may be ingested as channels within the search engine 314.

In some embodiments, the domain knowledge datastore 302 includes one or more models, such as a language model, a machine learning embedding model, and/or the like. In some examples, the models may be leveraged by the domain knowledge datastore 302 to augment source features for the query result data objects 360. For instance, a machine learning embedding model may be leveraged to generate a plurality of source embedding attributes to augment the features of the domain knowledge datastore 302. In some examples, the models (e.g., language models, embedding models, etc.) may be accessible (e.g., through machine learning service application programming interfaces (APIs), etc.) to process a search query. By way of example, the search engine 314 may include a model service 316 configured to access the one or more models of the domain knowledge datastore 302.

In some examples, the domain knowledge datastore 302 may include, for a clinical domain, a plurality of institutional provider profiles, including provider names, addresses, healthcare provider taxonomy codes (e.g., "207KA0200X"), network IDs, geocode (latitude/longitude), and/or miscellaneous information such as provider spoken languages, and/or the like. The plurality of institutional provider profiles, for example, may include provider data received from one or more third data sources 308. In addition, or alternatively, the domain knowledge datastore 302 may include medical claim data including medical codes, such as ICD codes, CPT codes, and/or the like, submitted by a provider in the last N months (default N=12). The medical claim data, for example, may be extracted and/or received from one or more second data sources 306 (e.g., claim processors, etc.) configured receive, process, and/or store medical claims. In addition, or alternatively, the domain knowledge datastore 302 may include public clinical knowledge resources, such as text descriptions of taxonomies, ICD, and CPT codes, and/or the like. For example, one description for the taxonomy code "207KA0200X" may be "a physician who specializes in the diagnosis, treatment, and management of allergies." In addition, or alternatively, the domain knowledge datastore 302 may include one or more lists of manually crafted keywords/phrases clinically associated with each taxonomy code. For example, one key phrase related to "207KA0200X" may be "skin rash", which is a common symptom of allergy. The clinical knowledge, for example, may be extracted and/or received from one or more first data sources 304.

In some examples, the domain knowledge datastore 302 may include a sentence-transformer based health informatics text-embedding model fine-tuned to extract semantic and context information from, and transform a text sequence (e.g., a taxonomy description) into a D-dimension (default D=384) numeric vector. For example, the domain knowledge datastore 302 may include a machine learning embedding model.

In some embodiments, the machine learning embedding model is a data entity that describes parameters, hyper-parameters, and/or defined operations of a rules-based and/or machine learning model (e.g., model including at least one of one or more rule-based layers, one or more layers that depend on trained parameters, coefficients, and/or the like). A machine learning embedding model may include one or more machine learning models configured, trained (e.g., jointly, separately, etc.), and/or the like to encode textual data into one or more embeddings. A machine learning embedding model may include one or more of any type of machine learning model including one or more supervised, unsupervised, semi-supervised, reinforcement learning models, and/or the like. In some examples, a machine learning embedding model may include multiple models configured to perform one or more different stages of an embedding process.

In some embodiments, a machine learning embedding model is trained using one or more supervised training techniques. In some examples, a machine learning embedding model may be trained to factorize one or more inputs, such as one or more text strings, to generate an embedded vector. In some examples, a machine learning embedding model may be trained such that the model's latent space is representative of certain semantic domains/contexts, such as a clinical domain. For example, a machine learning embedding model may be trained to generate embeddings representative of one or more learned (and/or prescribed, etc.) relationships between one or more words, phrases, and/or sentences. By way of example, a machine learning embedding model may represent a semantic meaning of a word and/or sentence differently in relation to other words and/or sentences, and/or the like. The machine learning embedding model may include any type of embedding model finetuned on information for a particular search domain. By way of example, a machine learning embedding model may include one or more of SBERT, ClinicalBERT, BERT, Word2Vec, GloVe, Doc2Vec, InferSent, Universal Sentence Encoder, and/or the like. A machine learning embedding model may be finetuned on the domain knowledge datastore 302, a plurality of historical search queries from the search engine 314, and/or the like.

In some examples, the domain knowledge datastore 302 may include an LLM that serves as a "library of knowledge" for interpreting queries. For example, the domain knowledge datastore 302 may include a language model.

In some embodiments, the language model is data entity that describes parameters, hyper-parameters, and/or defined operations of a rules-based and/or machine learning model (e.g., model including at least one of one or more rule-based layers, one or more layers that depend on trained parameters, coefficients, and/or the like). A language model may include one or more machine learning models configured, trained (e.g., jointly, separately, etc.), and/or the like to generate contextual information for a search query. A language model may include one or more of any type of machine learning model including one or more supervised, unsupervised, semi-supervised, reinforcement learning models, and/or the like. In some examples, a language model may include multiple models configured to perform one or more different stages of a generative language process.

In some embodiments, a language model is a generative machine learning model, such as an LLM. For example, a language model may include an LLM configured to generate contextual information for a search query that is grounded by a particular search domain. By way of example, the LLM may be trained using text data, such as source text attributes, for a search domain. The text data, for example, may be aggregated by the domain knowledge datastore 302 configured for a search domain.

In addition, or alternatively, the domain knowledge datastore may include one or more enhanced taxonomies that correlate one or more disparate sets of data, such as correlating ICD codes with CPT codes, and/or the like. For example, the domain knowledge datastore 302 may include an enhanced taxonomy.

In some embodiments, the enhanced taxonomy is a taxonomy dataset that is augmented with a plurality of augmented taxonomy categories. Augmented taxonomy categories, for example, may include a taxonomy category that is augmented with at least a portion of a textual description corresponding to an associated code. In some examples, an augmented taxonomy category may be generated by mapping, associating with, appending, and/or the like a textual description (at least a portion thereof) to a taxonomy category. In this manner, the taxonomy dataset may be augmented to generate an enhanced taxonomy with a plurality of augmented taxonomy categories. By increasing the contextual information for the taxonomy categories of various taxonomy datasets, the enhanced taxonomy may be leveraged to make more relevant and targeted connections between a search query and a plurality of potential search results. This, in turn, may enable more accuracy query resolutions, while preventing null results that are predominant in traditional query resolution techniques.

The domain knowledge datastore 302 may be communicatively connected to the search engine 314, which may be configured to receive a search query and leverage the domain knowledge datastore 302 to generate a query resolution for the search query. By way of example, the search engine 314 may include a billion-scale vector search engine that may be backward compatible to support traditional and/or advanced search functions. For instance, the search engine 314 may include a plurality of internal and external application programming interfaces collectively configured to facilitate a multi-modal search query resolution.

In some embodiments, the search engine 314 includes a plurality of search interfaces configured to interact with a plurality of users 350. The search interfaces may include a conversational search interface 320, a textual search interface 322, and/or the like. The textual search interface 322 may include a federated API that is configured to initiate one or more different search routines based on a search query input by a user 350. For example, the different search routines may include a keyword search, a code search, and/or a topic search.

In some examples, a keyword search routine may receive a search query (and/or portions thereof), such as a name/address, one or more geo-structured filters, and/or the like, and initiate one or more computing tasks, such as typeahead/term query tasks, spelling correction tasks, and/or the like, based on the search query. In some examples, the keyword search routine may generate one or more similarity scores for a plurality of source features using one or more techniques of the present disclosure. In some examples, the keyword search routine may return one or more matched query result data objects to the textual search interface 322 for providing a query resolution to the user 350.

In some examples, a code search routine may receive a search query (and/or portions thereof), such as one or more alphanumeric codes (e.g., ICD codes, CPT codes, etc.), and/or the like, and initiate one or more computing tasks based on the search query. In some examples, the code search routine may generate one or more similarity scores for a plurality of source features using one or more techniques of the present disclosure. In some examples, the code search routine may return one or more matched query result data objects to the textual search interface 322 for providing a query resolution to the user 350.

In some examples, a topic search routine may receive a search query (and/or portions thereof), such as one or more generic text references (e.g., service topics, etc.), and/or the like, and initiate one or more computing tasks, such as typeahead/term query tasks, spelling correction tasks, and/or the like, based on the search query (and/or portions thereof). In some examples, the topic search routine may generate one or more similarity scores for a plurality of source features using one or more techniques of the present disclosure. By way of example, the one or more similarity scores may include one or more aggregated similarity scores that aggregate keyword and embedding similarities across a plurality of source features. In some examples, the topic search routine may return one or more matched query result data objects to the textual search interface 322 for providing a query resolution to the user 350.

In some examples, the topic search routine may be configured to generate, using the language model, an expanded query for the search query to enhance a query resolution for a user. In some examples, the same and/or similar techniques may be leveraged by the conversational search interface 320 to provide contextual data to the user 350 based on an intermediate search query. For instance, the topic search routine may generate an expanded query and leverage the expanded query to generate a query resolution for a search query. The conversational search interface 320 may generate an expanded query and provide the expanded query to the user 350. The user 350 may leverage the expanded query as a new search query to textual search interface 322.

In some embodiments, the expanded query is a data entity that describes a search query that is augmented with contextual information for a search domain. An expanded query, for example, may include a structured and/or natural language sequence of text. In some examples, the expanded query may be generated from a search query using a language model. For example, a language model may be applied to the search query to interpret the search query and generate contextual information to augment the natural language sequence of text of the search query. In some examples, as described herein, a language model may be trained using a text data for a particular search domain to generate contextual information that is relevant for the search domain. For instance, in a clinical domain, a search query for a term "sickle cell," which may be a rare genetic disorder in blood cells, may be expanded to "sickle cell disease is a genetic disorder that affects the red blood cells" to provide semantic and syntactic information to improve the similarity between the search query and one or more intermediate or final search results for the search query. By way of example, the added phrases "genetic disorder," "red blood cells," and/or the like may improve similarities with proper specialties, such as a "hematologist" that may treat the originally provided search query, "sickle cell."

In some embodiments, the search engine 314 facilitates the computing tasks for each of the search routines through communications with the domain knowledge datastore 302. For instance, the search engine 314 may include a model service 316 for accessing one or more models (e.g., through one or more model backends, etc.) of the domain knowledge datastore 302. The one or more models, for example, may be accessed to generate embedding representations for a search query (e.g., using a machine learning embedding model, etc.), generate expanded queries (e.g., using language model, etc.), and/or the like.

In addition, or alternatively, the search engine 314 may ingest a plurality of multi-channel information from the domain knowledge datastore 302. For example, the multi-channel information may be ingested by a content/index server 318. The multi-channel information may be configured, using a configuration server and/or communication server, in accordance with one or more data schemas of the domain knowledge datastore 302. In this manner, comprehensive data from a plurality of different data sources may be aggregated, pruned, and organized in a searchable manner by the domain knowledge datastore 302 and then ingested as multi-channel representations to the search engine 314 for processing a search query.

In some embodiments, the search engine 314 is configured to generate a query resolution for a search query using one or more multi-modal searching techniques. An example of a query resolution technique will now further be described with reference to FIG. 4.

Figure 4:
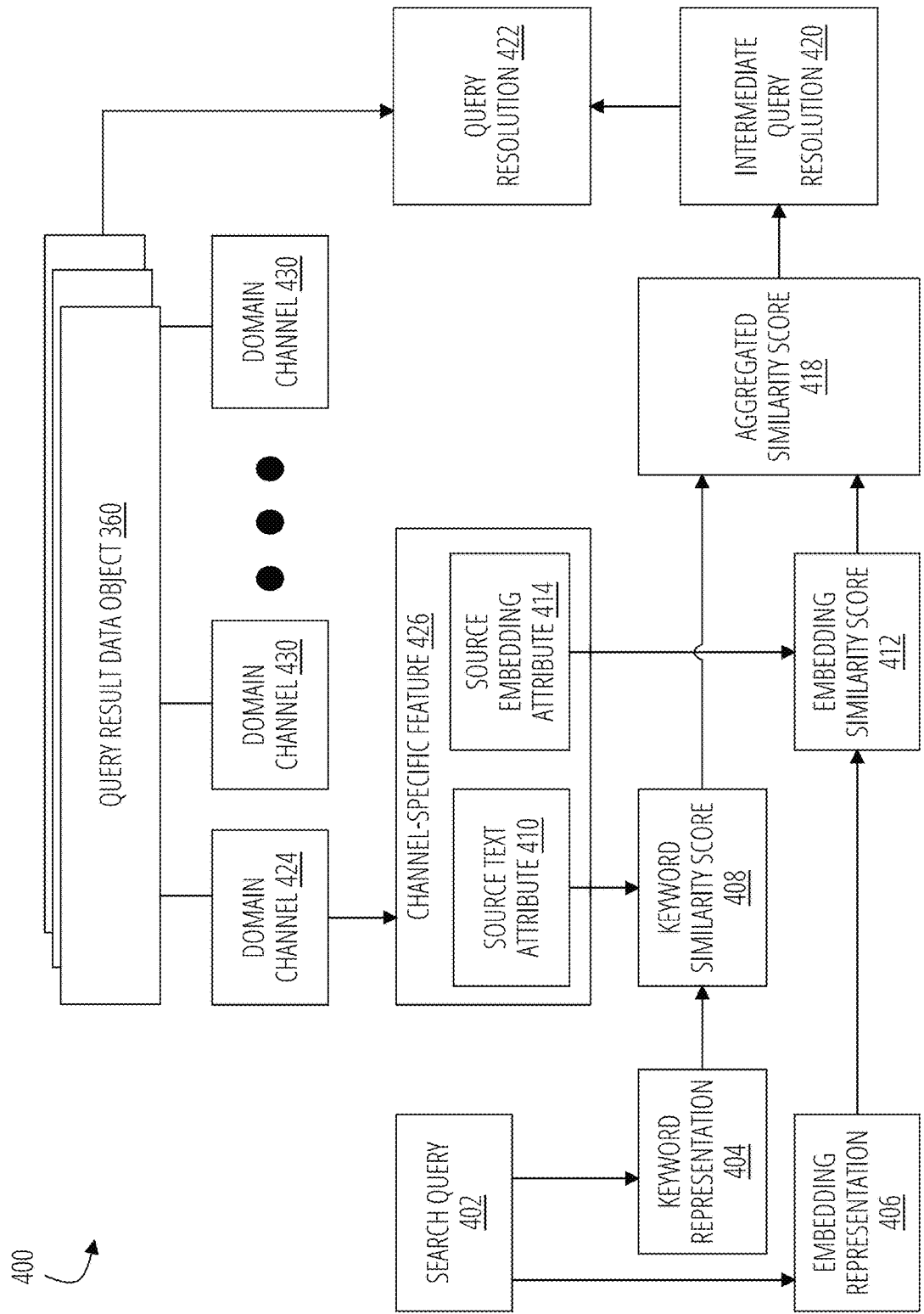
FIG. 4 is a dataflow diagram showing example data structures and modules for generating a query resolution in accordance with some embodiments discussed herein.

FIG. 4 is a dataflow diagram 400 showing example data structures and modules for generating a query resolution in accordance with some embodiments discussed herein. The dataflow diagram 400 shows a multi-modal query resolution process for generating a query resolution from a search query 402.

In some embodiments, a search query 402 is received. The search query 402, for example, may include a natural language text sequence and/or one or more contextual search attributes.

In some embodiments, the search query 402 is a data entity that describes a text-based search query for a search domain. A search query 402, for example, may include a structured and/or natural language sequence of text (e.g., one or more alphanumeric characters, symbols, etc.). In some examples, the search query 402 may include user input, such as text input and/or text generated from one or more audio, tactile, and/or like inputs. In some examples, the search query 402 may include a natural language sequence of text. In some examples, the natural language sequence of text may be associated with one or more contextual query attributes. The contextual query attributes, for example, may include a location attribute (e.g., a global positioning system (GPS) position, a latitude/longitude, etc.), one or more structured filters (e.g., selected categories, etc.), and/or the like. In some examples, the search query 402 may include (i) a natural language sequence of text that expresses a question, preference, and/or the like and/or (ii) one or more contextual query attributes for constraining a result for the natural language sequence of text.

In some embodiments, the search query 402 is based on a search domain. For example, a search query 402 for a clinical domain may include a natural language sequence of text to express a description of a medical condition and/or contextual query attributes, such as a location, member network, and/or the like that may constrain a recommendation for addressing the medical condition for a user. In some examples, the search query 402 for a particular search domain may include one or more characteristics. As some examples, the search query 402 may include a full word (e.g., "pediatrics" in a clinical domain) or a partial word (e.g., "pedi") text. In addition, or alternatively, the search queries 402 may correspond to one or more different topics within a search domain, such as (i) clinical conditions (e.g., adhd, etc.), (ii) clinical specialties (e.g., urgent care, etc.), and (iii) clinical services (eye exam, etc.) in a clinical domain. In some examples, the search query 402 may be constrained by factors that correspond to the particular search domain, such as network plans, languages spoken by healthcare providers, a user's ability to travel for treatment, among other examples for a clinical domain. By way of example, keeping with the clinical example, a user may consider traveling 100 miles to have a foot surgery but would not want their primary care provider to be more than 5 miles from their location.

In some embodiments, the search query 402 is input to and/or processed by a search engine, as described herein. For example, a user may be allowed to type in full words (e.g., "pediatrics gastroenterology" in a clinical domain), partial words (e.g., "joh") that may be autocompleted as best matched word(s) (e.g., "john", "johnathan"), and/or the like into a search interface of the search engine. In response to the search query 402, the search engine may generate a plurality of comprehensive search results. For instance, using some of the techniques of the present disclosure, one or more multi-modal search functions may be applied to the search query 402 (e.g., keyword search on provider profiles (e.g., names, addresses, IDs, etc.), topic search, etc.) to extract semantic and contextual information from the search query 402 and intelligently match the search query 402 with comprehensive query result data objects 360. In some examples, search/typeahead functions may be used in combination with structured filters (e.g., location, provider network) to accommodate user preferences.

In some embodiments, a keyword representation 404 and/or an embedding representation 406 are generated for the search query 402. The keyword representation 404, for example, may include one or more text units from the natural language text sequence of the search query 402. In addition, or alternatively, the embedding representation 406 may include a numerical vector for the natural language text sequence.

In some embodiments, the keyword representation 404 is a text-based representation of a search query 402. For example, the keyword representation 404 may include a plurality of text units from a textual sequence. The text units, for example, may include a plurality of keywords extracted (e.g., by a keyword extraction model, etc.) from the textual sequence. By way of example, the keyword representation 404 may include the plurality of extracted keywords.

In some embodiments, the embedding representation 406 is a vector-based representation of the search query 402. For example, the embedding representation 406 may include an embedded vector from a textual sequence associated with the search query. The embedding representation 406, for example, may include an embedding vector (e.g., numeric vector, etc.) that captures a search query's semantic and/or contextual meaning. By way of example, the embedding representation 406 may be generated by processing the search query 402 with a machine learning embedding model, such as the machine learning model described herein.

In some embodiments, an expanded query is generated for the search query 402. For example, the expanded query may be generated using a language model as described herein. The language model, for example, may be trained based on a plurality of source features (e.g., source text attributes thereof, etc.) from a domain channel. In some examples, the keyword representation 404 and/or the embedding representation 406 may be generated based on the expanded query.

In some embodiments, a plurality of similarity scores is generated for the search query 402 based on the keyword representation 404 and/or embedding representation 406. In some examples, each similarity score may be indicative (e.g., a measure representing, etc.), of a similarity between the search query 402 and a source feature associated with one or more query result data objects 428. For example, each similarity score may be generated based on a measure of similarity between a query representation (e.g., keyword representation 404, embedding representation 406, etc.) and a corresponding representation for a particular source feature within a dataset associated with a plurality of query result data objects 428.

In some examples, a query result data object 360 is a data entity that describes a potential search result for a search domain. The query result data object 360, for example, may be indicative (e.g., include an entity identifier, textual description, etc.) of an entity that is associated with one or more source features from the domain knowledge datastore. By way of example, the query result data object 360 may include a profile for an entity that includes a plurality of source features corresponding to the entity. The entity may depend on the search domain. As one example, in a clinical domain, an entity may be a healthcare provider (e.g., facility, practitioner, medical group, etc.) and the query result data object 360 may include a provider profile identifying a plurality of source features corresponding to the healthcare provider. In some examples, the plurality of source features for a particular query result data object 360 may be distributed across a plurality of different information channels.

In some examples, a source feature is a data entity that describes a characteristic corresponding to one or more potential search results of a search domain. A source feature, for example, may be indicative (e.g., include an attribute identifier, textual description, etc.) of an attribute that may be associated with one or more query result data objects 360. For instance, a source feature may include an object-specific source feature that corresponds to a single query result data object (e.g., a unique name, precise location, etc.). In addition, or alternatively, a source feature may include an object-generic source feature (e.g., a general location, a specialty, an activity frequency, etc.). In some examples, the object-generic source features (and/or the object-specific source features) may be based on a search domain. By way of example, a clinical domain may include a plurality of source features that describe one or more taxonomy codes (e.g., clinical specialties, etc.), assessment codes (e.g., ICD codes, etc.), intervention codes (e.g., CPT codes, etc.), and/or the like that may associated with one or more of the plurality of query result data objects 360 within a search domain.

In some examples, a source text attribute is an attribute of a source feature represented as one or more characters. For example, a source text attribute may include a numeric, alpha-numeric, and/or the like code (e.g., taxonomy code, ICD code, CPT code, etc.) that corresponds to a source feature. In addition, or alternatively, a source text attribute may include a textual description that corresponds to the source feature (e.g., a taxonomy description, code description, etc.).

In some examples, a source embedding attribute is an attribute of a source feature represented as a numerical vector. For example, a source embedding attribute may include an embedded representation of a source text attribute and/or contextual information for the source text attribute. In some examples, a source embedding attribute may be generated, using a machine learning embedding model, for one or more of the source features to complement a source text attribute in a multi-modal search environment.

In some embodiments, the similarity scores are generated for each of a plurality of source features from a multi-channel dataset. The multi-channel dataset, for example, may include a plurality of domain channels, such as the domain channel 424 and/or one or more other domain channels 430. The domain channel 424, for example, may be one of a plurality of domain channels (e.g., domain channel 424, other domain channels 430, etc.). In some examples, each of the domain channels, such as the domain channel 424, may include channel-specific features 426. By way of example, the domain channel 424 may include a first domain channel with a plurality of first channel features corresponding to a first topic type. In addition, or alternatively, the other domain channels 430 may include a second domain channel with a plurality of second channel features corresponding to a second topic type, a third domain channel with a plurality of third channel features corresponding to a third topic type, a fourth domain channel with a plurality of fourth channel features corresponding to a fourth topic type, a fifth domain channel with a plurality of fifth channel features corresponding to a fifth topic type, and/or the like.

In some embodiments, each of the plurality of domain channels (e.g., domain channel 424, other domain channels 430, etc.) include one or more respective channel-specific features for each of a plurality of query result data objects 428. In some examples, each of the channel-specific features 426 may include one or more source text attributes 410 and/or source embedding attributes 414. The plurality of similarity scores may be based on a plurality of source text attributes 410 and a plurality of source embedding attributes 414 that respectively correspond to a plurality of channel-specific features 426 within the domain channel 424. A plurality of additional similarity scores may be generated in the same and/or similar manner with respect to each of the other domain channels 430 within the multi-channel dataset to generate a plurality of multi-modal similarity scores across a plurality of different information channels.

In some embodiments, the domain channel 424 is a dataset of source features that correspond to a sub-domain within a search domain. For example, a complex search domain may be divided into a plurality of sub-domains, each representing different channels of information that may be collectively and/or individually queried to generate a query resolution 422 for a search query 402. Each of the plurality of sub-domains may be represented by a plurality of source features that correspond to a particular search topic within the complex search domain. According to some techniques of the present disclosure, a comprehensive search resolution may be generated by aggregating multi-channel search results across each of a plurality of domain channels corresponding to the respective sub-domains of the complex search domain. By way of example, some techniques of the present disclosure enable a single search query 402 to reach multiple verticals (e.g., sub-domains such as provider profiles, specialties, services, etc.) through a federated application programming interface (API) that submits queries to and aggregates matched results from each of the domain channels asynchronously. In this manner, a domain channel 424 may be leveraged as an efficient approach to group results from verticals and provide a comprehensive response to a search query 402.

In some embodiments, a number and type of domain channels depends on the search domain. For example, in a clinical search domain, source data from provider records may be represented with two, three, four, five, etc. channels of information. By way of example, a domain channel 424 may include five channels including a profile channel, an identifier channel, a taxonomy channel, an assessment channel, and intervention channel, and/or the like.

In some embodiments, the channel-specific feature 426 is a source feature of a domain channel 424. By way of example, a channel-specific feature 426 may include a profile feature for a profile channel, an identifier feature for an identifier channel, a taxonomy feature for a taxonomy channel, an assessment feature for an assessment channel, an intervention feature for an intervention channel, and/or the like.

In some embodiments, the profile channel is an example domain channel for a search domain. For example, in a clinical domain, a profile channel may include provider information such as a name, address, network identifiers, geo-location, and/or the like.

In some embodiments, the identifier channel is an example domain channel for a search domain. For example, in a clinical domain, an identifier channel may include provider-related IDs, such as national provider IDs, enterprise provider IDs, and/or the like.

In some embodiments, the taxonomy channel is an example domain channel for a search domain. For example, in a clinical domain, a taxonomy channel may include a plurality of taxonomy codes, textual descriptions, embedding vectors, and/or the like. In some examples, the taxonomy channel may capture a provider's specialty characteristics specified in the national practitioner data bank (NPDB).

In some embodiments, the assessment channel is an example domain channel for a search domain. For example, in a clinical domain, an assessment channel may include ICD codes, textual descriptions, embedding vectors of ICD descriptions, and/or the like. In some examples, the assessment channel may capture clinical conditions a provider has treated based the claim information.

In some embodiments, the intervention channel is an example domain channel for a search domain. For example, in a clinical domain, an intervention channel may include CPT codes, textual descriptions, embedding vectors of CPT descriptions, and/or the like. In some examples, the intervention channel captures clinical procedures a provider has performed based on the claim information.

In some embodiments, the plurality of similarity scores includes a plurality of keyword similarity scores 408. For example, a plurality of keyword similarity scores 408 may be generated between the keyword representation 404 and a plurality of source text attributes 410 from a domain channel 424.

In some embodiments, a keyword similarity score 408 is a text-based measure of similarity between the search query 402 and a source feature, such as the channel-specific feature 426. For example, the keyword similarity score 408 may include a numeric representation (e.g., a real number, probability, etc.) indicative (e.g., a measure representing, etc.) of a similarity between the search query 402 and the channel-specific feature 426. The keyword similarity score 408, for example, may include a syntactic similarity measure between the keyword representation 404 and a source text attribute 410 of a source feature, such as the channel-specific feature 426.

In some embodiments, the plurality of similarity scores includes a plurality of embedding similarity scores 412. For example, the plurality of embedding similarity scores 412 may be generated between the embedding representation 406 and a plurality of source embedding attribute 414s from the domain channel 424.

In some embodiments, an embedding similarity score 412 is an embedding-based measure of similarity between a search query 402 and a source feature. For example, an embedding similarity score 412 may include a numeric representation (e.g., a real number, probability, etc.) indicative (e.g., a measure representing, etc.) of a similarity between the search query 402 and the channel-specific feature 426. The embedding similarity score 412, for example, may include a semantic similarity measure between the embedding representation 406 and/or the source embedding attribute 414 of the channel-specific feature 426. The embedding similarity score 412 may include any embedding distance calculation, such as cosine similarity scores, and/or the like, and/or any other embedding similarity comparison.

In some embodiments, an intermediate query resolution 420 for the search query 402 is generated based on a plurality of aggregated similarity scores 418 for the search query 402.

In some examples, an intermediate query resolution 420 may be indicative (e.g., include feature identifiers, textual descriptions, etc.) of a particular channel-specific feature of the plurality of channel-specific features 426. For example, the intermediate query resolution 420 may be based on an aggregated similarity score 418 between (i) the keyword similarity score 408 that corresponds to the source text attribute 410 for the particular channel-specific feature and (ii) the embedding similarity score 412 that corresponds to the source embedding attribute 414 for the particular channel-specific feature 426.

In some examples, the intermediate query resolution 420 may include one or more channel-specific features from one or more of the other domain channels 430. For example, each respective channel-specific feature of the one or more channel-specific features may correspond to a respective domain channel of the plurality of domain channels (e.g., domain channel 424, other domain channels 430, etc.).

In some embodiments, each of the plurality of aggregated similarity scores 418 include a weighted combination of (i) a keyword similarity score of the plurality of keyword similarity scores 408 and/or (ii) an embedding similarity score of the plurality of embedding similarity scores 412.

In some embodiments, an aggregated similarity score 418 is a measure of similarity between a search query 402 and a source feature. For example, the aggregated similarity score 418 may include a measure of similarity that is aggregated from one or more disparate similarity scores between a search query 402 and a channel-specific feature 426. In some examples, the aggregated similarity score 418 may include a weighted sum, product, and/or the like of matching scores (e.g., keyword similarity scores 408, embedding similarity scores 412, etc.) for the channel-specific feature 426. By way of example, the keyword representation 404 and the embedding representation 406 that match with a corresponding channel-specific feature 426 within a domain channel 424 may be leveraged to generate a plurality of complementary similarity scores, such as keyword similarity score 408 and embedding similarity score 412, for the channel-specific feature 426. The complementary similarity scores may be aggregated using a weighted sum, product, and/or the like to generate the aggregated similarity score 418 that may be used as a final relevance score between the search query 402 and the channel-specific feature 426 and/or domain channel 424. In this way, keyword matching techniques may be leveraged to capture literal similarities, while matching on embeddings captures semantic and contextual similarities between the search query 402 and the channel-specific feature 426. This unique combination takes advantage of both keyword search and embedding technologies to better capture relationships between multiple domain channels (e.g., clinical conditions, specialties, and services, etc. in a clinical domain) in a complex search domain.

In some embodiments, an intermediate query resolution 420 is a data entity that describes one or more source features corresponding to the search query 402. For example, an intermediate query resolution 420 may include an output of a first stage of a multi-stage search process. The intermediate query resolution 420, for example, may identify a plurality of source features from one or more domain channels 424 and/or other domain channels 430 for the search query 402. In some examples, a second stage of a multi-stage search process may be performed to generate the query resolution 422 based on the source features identified by the intermediate query resolution 420. In some examples, the second stage may be performed automatically. In addition, or alternatively, the second stage may be performed based on a selection of a user (e.g., selection of an intermediate query resolution 420, etc.).

In some embodiments, data indicative (e.g., include entity/attribute/feature identifiers, textual/pictorial descriptions, etc.) of the query resolution 422 is provided based on the intermediate query resolution 420. The query resolution 422, for example, may be indicative (e.g., include an entity identifier, textual description, etc.) of particular query result data object of the plurality of query result data objects 428. In some examples, the data indicative (e.g., include entity/attribute/feature identifiers, textual/pictorial descriptions, etc.) of the query resolution 422 may identify a particular query result data object and/or one or more channel-specific features 426 that correspond to the intermediate query resolution 420.

In some embodiments, a query resolution 422 is a data entity that describes one or more query result data objects corresponding to the search query 402. For example, the query resolution 422 may identify one or more query result data objects 360 (and/or one or more source features thereof) for the search query 402. In some examples, the query resolution 422 may include an output of a second stage of a multi-stage search process. The query resolution 422, for example, may identify one or more query result data objects 360 for the search query 402 based on a plurality of source features identified by the intermediate query resolution 420. By way of example, the query resolution 422 may include one or more query result data objects 360 that correspond to one or more source features (e.g., providers that may treat an identified condition, provide a service, practice in a specialty, etc.) identified from one or more of the domain channels 424 and/or other domain channels 430 of the search domain.

Figure 5:
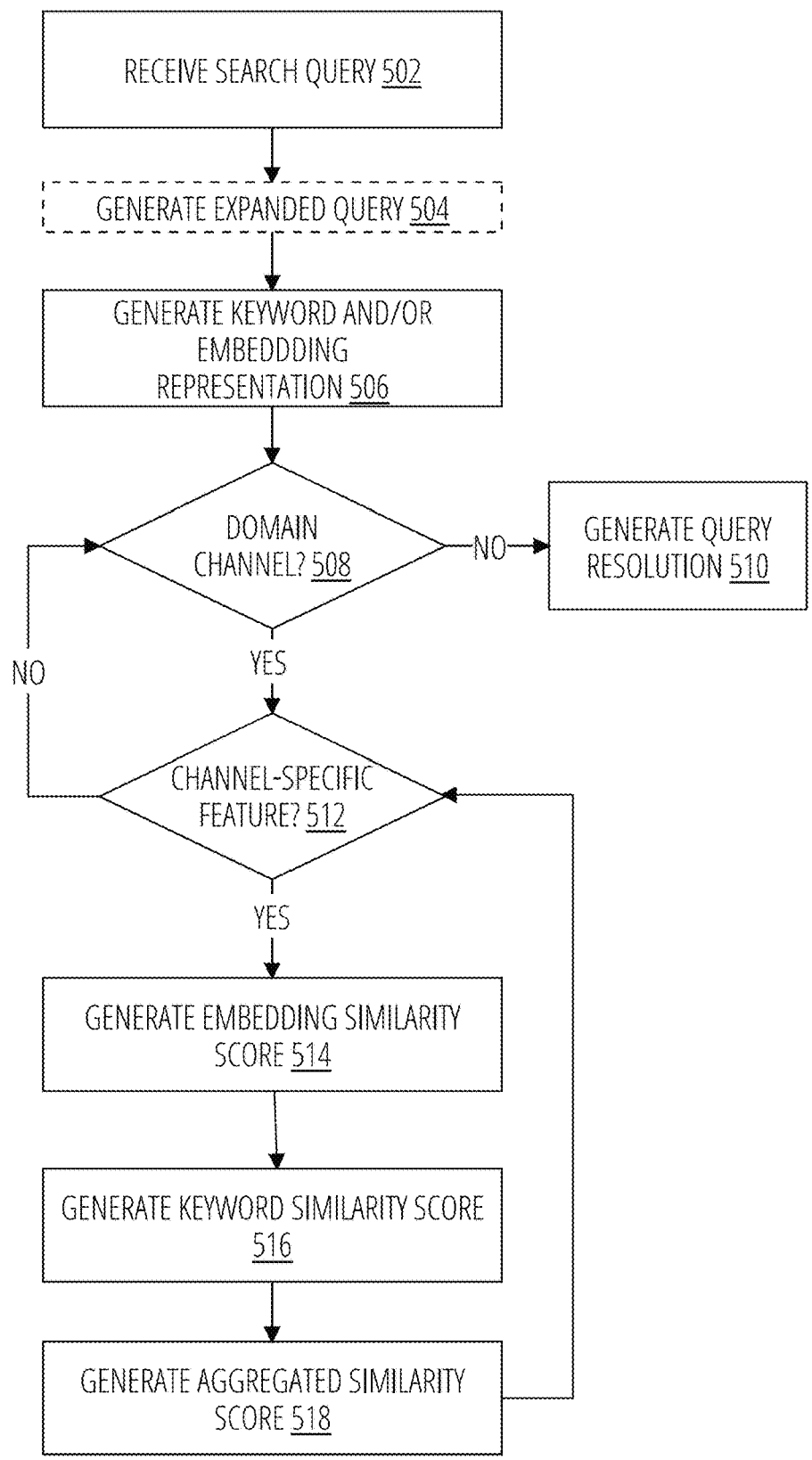
FIG. 5 is a flowchart showing an example of a multi-modal process for processing a search query in accordance with some embodiments discussed herein.

FIG. 5 is a flowchart showing an example of a multi-modal process 500 for processing a search query in accordance with some embodiments discussed herein. The flowchart depicts a multi-modal process 500 for improving query resolutions with respect to traditional query resolution techniques by inferring and aggregating syntactic, semantic, and other insights from a search query. The process 500 may be implemented by one or more computing devices, entities, and/or systems described herein. For example, via the various steps/operations of the process 500, the computing system 100 may leverage improved query resolution techniques to generate comprehensive query resolutions, while reducing null results and tailoring search results to contextual details underlying a search query. By way of example, unlike traditional query resolution techniques, the query resolution techniques may be capable of aggregating semantic and syntactic insights that holistically account for multiple aspects of a searches in a complex search domain.

FIG. 5 illustrates an example process 500 for explanatory purposes. Although the example process 500 depicts a particular sequence of steps/operations, the sequence may be altered without departing from the scope of the present disclosure. For example, some of the steps/operations depicted may be performed in parallel or in a different sequence that does not materially impact the function of the process 500. In other examples, different components of an example device or system that implements the process 500 may perform functions at substantially the same time or in a specific sequence.

In some embodiments, the process 500 includes, at step/operation 502, receiving a search query. For example, a computing system 100 may receive the search query. The search query may include a natural language text sequence.

In some embodiments, the process 500 includes, at step/operation 504, generate an expanded query. For example, a computing system 100 may generate, using a language model, an expanded query for the search query. In some examples, the language model may be trained based on a plurality of source text attributes from the domain channel.

In some embodiments, the process 500 includes, at step/operation 506, generate a keyword and/or embedding representation. For example, a computing system 100 may generate a keyword representation and/or an embedding representation for the search query. In some examples, the keyword representation may include one or more text units from the natural language text sequence. In some examples, the embedding representation may include a numerical vector for the natural language text sequence. In some examples, the computing system 100 may generate the keyword representation and/or the embedding representation for the search query based on the expanded query.

In some embodiments, the process 500 includes, at step/operation 508, accessing a domain channel of a search domain. For example, a computing system 100 may access one or more domain channels of the search domain. For example, a domain channel may be one of a plurality of domain channels of the search domain. By way of example, the plurality of domain channels may include a first domain channel comprising a plurality of first channel features corresponding to a first topic type, a second domain channel comprising a plurality of second channel features corresponding to a second topic type, a third domain channel comprising a plurality of third channel features corresponding to a third topic type, a fourth domain channel comprising a plurality of fourth channel features corresponding to a fourth topic type, and/or a fifth domain channel comprising a plurality of fifth channel features corresponding to a fifth topic type.

In the event that there is another domain channel, the process 500 may proceed to step/operation 512, in which a channel-specific feature is accessed from the next domain channel. Otherwise, the process 500 may proceed to step/operation 510, in which a query resolution is generated.

In some embodiments, the process 500 includes, at step/operation 512, accessing a channel-specific feature from a domain channel. For example, a computing system 100 may access one or more channel-specific features from the domain channel. For example, each respective channel-specific feature of the one or more channel-specific features may correspond to a respective domain channel of the plurality of domain channels. By way of example, each of the plurality of domain channels may include one or more respective channel-specific features for each of a plurality of query result data objects associated with a search domain.

In the event that there is another channel-specific feature, the process 500 may proceed to step/operation 514, in which one or more similarity scores are generated for the channel-specific feature. Otherwise, the process 500 may return to step/operation 508, in which another domain channel is accessed.

In some embodiments, the process 500 includes, at step/operation 514, generating an embedding similarity score. For example, a computing system 100 may generate a plurality of embedding similarity scores between the embedding representation and a plurality of source embedding attributes from the domain channel. For instance, the plurality of source embedding attributes may respectively correspond to a plurality of channel-specific features within the domain channel. For example, the computing system 100 may generate an embedding similarity score for the source embedding attribute of the channel-specific feature. By way of example, the embedding similarity score may correspond to a source embedding attribute for the particular channel-specific feature.

In some embodiments, the process 500 includes, at step/operation 516, generating a keyword similarity score. For example, a computing system 100 may generate a plurality of keyword similarity scores between the keyword representation and a plurality of source text attributes from a domain channel. For instance, the plurality of source text attributes may respectively correspond to a plurality of channel-specific features within the domain channel. For example, the computing system 100 may generate a keyword similarity score for the source text attribute of the channel-specific feature. By way of example, the keyword similarity score may correspond to a source text attribute for the particular channel-specific feature.

In some embodiments, the process 500 includes, at step/operation 518, generating an aggregated similarity score. For example, a computing system 100 may generate a plurality of aggregated similarity scores each comprising a weighted combination of (i) a keyword similarity score of the plurality of keyword similarity scores and (ii) an embedding similarity score of the plurality of embedding similarity scores. For example, the computing system 100 may generate an aggregated similarity score for the channel-specific feature based on a comparison between the keyword similarity score and the embedding similarity score for the channel-specific feature.

Figure 6:
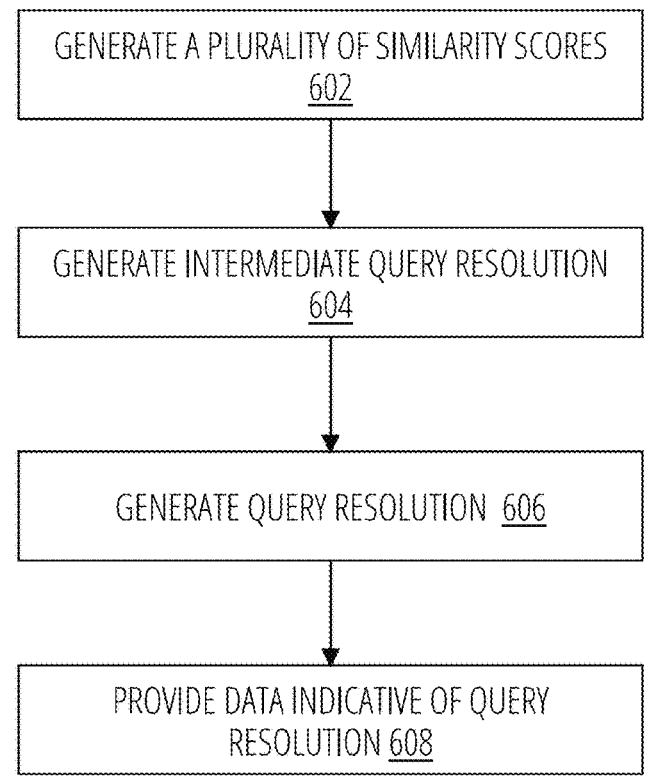
FIG. 6 is a flowchart showing an example of a process for generating a query resolution in accordance with some embodiments discussed herein.

FIG. 6 is a flowchart showing an example of a process 600 for generating a query resolution in accordance with some embodiments discussed herein. The flowchart depicts a process 600 for improving query resolutions with respect to traditional query resolution techniques by leveraging a multi-stage query resolution technique. The process 600 may be implemented by one or more computing devices, entities, and/or systems described herein. For example, via the various steps/operations of the process 600, the computing system 100 may leverage improved multi-stage query resolution techniques to generate comprehensive query resolutions based on the underlying features of the query result data objects. In this manner, unlike traditional query resolution techniques, the multi-stage query resolution techniques embodied by the process 600 may be capable of generating holistic query resolutions that are tailored to the underlying intent of a user and provide interpretable insights to explain the relevance of the query resolutions.

FIG. 6 illustrates an example process 600 for explanatory purposes. Although the example process 600 depicts a particular sequence of steps/operations, the sequence may be altered without departing from the scope of the present disclosure. For example, some of the steps/operations depicted may be performed in parallel or in a different sequence that does not materially impact the function of the process 600. In other examples, different components of an example device or system that implements the process 600 may perform functions at substantially the same time or in a specific sequence.

In some embodiments, the process 600 includes, at step/operation 602, generating a plurality of similarity scores. For example, a computing system 100 may generate a plurality of embedding similarity scores and/or keyword similarity scores, as described herein, for one or more channel-specific features across one or more domain channels of a search domain.

In some embodiments, the process 600 includes, at step/operation 604, generating an intermediate query resolution. For example, a computing system 100 may generate the intermediate query resolution for a search query based on a plurality of aggregated similarity scores each comprising a weighted combination of (i) a keyword similarity score of the plurality of keyword similarity scores and (ii) an embedding similarity score of the plurality of embedding similarity scores. In some examples, the intermediate query resolution may be indicative (e.g., include feature identifiers, textual/pictorial descriptions, etc.) of a particular channel-specific feature of a plurality of channel-specific features. On some examples, the intermediate query resolution may include one or more channel-specific features from one or more of a plurality of domain channels of the search domain.

In some embodiments, the process 600 includes, at step/operation 606, generating a query resolution. For example, a computing system 100 may generate the query resolution. In some examples, the query resolution may be indicative (e.g., including entity identifiers, textual descriptions, etc.) of a particular query result data object of a plurality of query result data objects associated with a search domain.

In some embodiments, the process 600 includes, at step/operation 608, providing data indicative (e.g., including entity/attribute/feature identifiers, textual descriptions, etc.) of the query resolution. For example, a computing system 100 may provide data indicative (e.g., including entity/attribute/feature identifiers, textual descriptions, etc.) of a query resolution based on the intermediate query resolution. In some examples, the data indicative (e.g., include entity/attribute/feature identifiers, textual descriptions, etc.) of the query resolution identifies the particular query result data object and/or one or more channel-specific features that correspond to the intermediate query resolution.

Some techniques of the present disclosure enable the generation of action outputs that may be performed to initiate one or more prediction-based actions to achieve real-world effects. The computer interpretation techniques of the present disclosure may be used, applied, and/or otherwise leveraged to generate enhanced query resolutions, which may help in the interpretation and resolution of search queries. The enhanced query resolutions of the present disclosure may be leveraged to initiate the performance of various computing tasks that improve the performance of a computing system (e.g., a computer itself, etc.) with respect to various prediction-based actions performed by the computing system 100, such as for the resolution of search queries and/or the like. Example prediction-based actions may include the display, transmission, and/or the like of comprehensive data tailored to a user input, such as a query input, a conversational input, and/or the like. Moreover, one or more prediction-based actions may be derived from such comprehensive data, such as the identification of a condition (e.g., medical condition, and/or the like) for which a prediction-based action may be initiated to automatically address.

In some examples, the computing tasks may include prediction-based actions that may be based on a search domain. A search domain may include any environment in which computing systems may be applied to achieve real-word insights, such as search predictions (e.g., query resolutions, etc.), and initiate the performance of computing tasks, such as prediction-based actions to act on the real-world insights (e.g., derived from query resolutions, etc.). These prediction-based actions may cause real-world changes, for example, by controlling a hardware component, providing alerts, interactive actions, and/or the like.

Examples of search domains may include financial systems, clinical systems, autonomous systems, robotic systems, and/or the like. Prediction-based actions in such domains may include the initiation of automated instructions across and between devices, automated notifications, automated scheduling operations, automated precautionary actions, automated security actions, automated data processing actions, and/or the like.

In some embodiments, the multi-modal query processing techniques of the process 500 and/or the multi-stage query resolution techniques of the process 600 are applied to initiate the performance of one or more prediction-based actions. A prediction-based action may depend on the search domain. In some examples, the computing system 100 may leverage the multi-modal query processing and/or the multi-stage query resolution techniques to initiate the resolution of a search query, and/or the like.

VI. CONCLUSION

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Example 1. A computer-implemented method, the computer-implemented method comprising generating, by one or more processors, a keyword representation and an embedding representation for a search query; generating, by the one or more processors, a plurality of keyword similarity scores between the keyword representation and a plurality of source text attributes from a domain channel; generating, by the one or more processors, a plurality of embedding similarity scores between the embedding representation and a plurality of source embedding attributes from the domain channel; generating, by the one or more processors, an intermediate query resolution for the search query based on a plurality of aggregated similarity scores each comprising a weighted combination of (i) a keyword similarity score of the plurality of keyword similarity scores and (ii) an embedding similarity score of the plurality of embedding similarity scores; and providing, by the one or more processors, data indicative of a query resolution based on the intermediate query resolution.

Example 2. The computer-implemented method of example 1, wherein the search query comprises a natural language text sequence, the keyword representation comprises one or more text units from the natural language text sequence, and the embedding representation comprises a numerical vector for the natural language text sequence.

Example 3. The computer-implemented method of any of the preceding examples, wherein the plurality of source text attributes and the plurality of source embedding attributes respectively correspond to a plurality of channel-specific features within the domain channel.

Example 4. The computer-implemented method of example 3, wherein (i) the intermediate query resolution is indicative of a particular channel-specific feature of the plurality of channel-specific features, (ii) the keyword similarity score corresponds to a source text attributes for the particular channel-specific feature, and (iii) the embedding similarity score corresponds to a source embedding attributes for the particular channel-specific feature.

Example 5. The computer-implemented method of any of the preceding examples, wherein the domain channel is one of a plurality of domain channels and the intermediate query resolution comprises one or more channel-specific features from one or more of the plurality of domain channels, wherein each respective channel-specific feature of the one or more channel-specific features corresponds to a respective domain channel of the plurality of domain channels.

Example 6. The computer-implemented method of example 5, wherein the plurality of domain channels comprise (i) a first domain channel comprising a plurality of first channel features corresponding to a first topic type; (ii) a second domain channel comprising a plurality of second channel features corresponding to a second topic type; (iii) a third domain channel comprising a plurality of third channel features corresponding to a third topic type; (iv) a fourth domain channel comprising a plurality of fourth channel features corresponding to a fourth topic type; and (v) a fifth domain channel comprising a plurality of fifth channel features corresponding to a fifth topic type.

Example 7. The computer-implemented method of examples 5 or 6, wherein each of the plurality of domain channels comprises one or more respective channel-specific features for each of a plurality of query result data objects, and the query resolution is indicative of a particular query result data object of the plurality of query result data objects.

Example 8. The computer-implemented method of example 7, wherein the data indicative of the query resolution identifies the particular query result data object and one or more respective channel-specific features that correspond to the intermediate query resolution.

Example 9. The computer-implemented method of any of the preceding examples, further comprising generating, using a language model, an expanded query for the search query; and generating the keyword representation and the embedding representation for the search query based on the expanded query.

Example 10. The computer-implemented method of example 9, wherein the language model is trained based on the plurality of source text attributes from the domain channel.

Example 11. A computing system comprising memory and one or more processors communicatively coupled to the memory, the one or more processors configured to generate a keyword representation and an embedding representation for a search query; generate a plurality of keyword similarity scores between the keyword representation and a plurality of source text attributes from a domain channel; generate a plurality of embedding similarity scores between the embedding representation and a plurality of source embedding attributes from the domain channel; generate an intermediate query resolution for the search query based on a plurality of aggregated similarity scores each comprising a weighted combination of (i) a keyword similarity score of the plurality of keyword similarity scores and (ii) an embedding similarity score of the plurality of embedding similarity scores; and provide data indicative of a query resolution based on the intermediate query resolution.

Example 12. The computing system of example 11, wherein the search query comprises a natural language text sequence, the keyword representation comprises one or more text units from the natural language text sequence, and the embedding representation comprises a numerical vector for the natural language text sequence.

Example 13. The computing system of examples 11 or 12, wherein the plurality of source text attributes and the plurality of source embedding attributes respectively correspond to a plurality of channel-specific features within the domain channel.

Example 14. The computing system of example 13, wherein (i) the intermediate query resolution is indicative of a particular channel-specific feature of the plurality of channel-specific features, (ii) the keyword similarity score corresponds to a source text attributes for the particular channel-specific feature, and (iii) the embedding similarity score corresponds to a source embedding attributes for the particular channel-specific feature.

Example 15. The computing system of any of examples 11 through 14, wherein the domain channel is one of a plurality of domain channels and the intermediate query resolution comprises one or more channel-specific features from one or more of the plurality of domain channels, wherein each respective channel-specific feature of the one or more channel-specific features corresponds to a respective domain channel of the plurality of domain channels.

Example 16. The computing system of example 15, wherein the plurality of domain channels comprise (i) a first domain channel comprising a plurality of first channel features corresponding to a first topic type; (ii) a second domain channel comprising a plurality of second channel features corresponding to a second topic type; (iii) a third domain channel comprising a plurality of third channel features corresponding to a third topic type; (iv) a fourth domain channel comprising a plurality of fourth channel features corresponding to a fourth topic type; and (v) a fifth domain channel comprising a plurality of fifth channel features corresponding to a fifth topic type.

Example 17. The computing system of examples 15 or 16, wherein each of the plurality of domain channels comprises one or more respective channel-specific features for each of a plurality of query result data objects, and the query resolution is indicative of a particular query result data object of the plurality of query result data objects.

Example 18. The computing system of example 17, wherein the data indicative of the query resolution identifies the particular query result data object and one or more respective channel-specific features that correspond to the intermediate query resolution.

Example 19. One or more non-transitory computer-readable storage media including instructions that, when executed by one or more processors, cause the one or more processors to generate a keyword representation and an embedding representation for a search query; generate a plurality of keyword similarity scores between the keyword representation and a plurality of source text attributes from a domain channel; generate a plurality of embedding similarity scores between the embedding representation and a plurality of source embedding attributes from the domain channel; generate an intermediate query resolution for the search query based on a plurality of aggregated similarity scores each comprising a weighted combination of (i) a keyword similarity score of the plurality of keyword similarity scores and (ii) an embedding similarity score of the plurality of embedding similarity scores; and provide data indicative of a query resolution based on the intermediate query resolution.

Example 20. The one or more non-transitory computer-readable storage media of example 19, wherein the one or more processors are further caused to generate, using a language model, an expanded query for the search query; and generate the keyword representation and the embedding representation for the search query based on the expanded query.

The invention claimed is:

1. A computer-implemented method comprising:
generating, by one or more processors, a keyword representation and an embedding representation for a search query;
generating, by the one or more processors, a plurality of keyword similarity scores, wherein a keyword similarity score of the plurality of keyword similarity scores is between the keyword representation and a source text attribute of a plurality of source text attributes from a domain channel of a plurality of domain channels, wherein the domain channel comprises a channel-specific feature for a query result data object of a plurality of query result data objects;
generating, by the one or more processors, a plurality of embedding similarity scores, wherein an embedding similarity score of the plurality of embedding similarity scores is between the embedding representation and a source embedding attribute of a plurality of source embedding attributes from the domain channel;
generating, by the one or more processors, an intermediate query resolution for the search query based on a plurality of aggregated similarity scores, wherein:
(1) an aggregated similarity score of the plurality of aggregated similarity scores comprises a weighted combination of (i) the keyword similarity score of the plurality of keyword similarity scores and (ii) the embedding similarity score of the plurality of embedding similarity scores, and
(2) the intermediate query resolution comprises the channel-specific feature for the query result data object; and
providing, by the one or more processors, data indicative of a query resolution based on the intermediate query resolution, wherein the query resolution comprises the query result data object.

2. The computer-implemented method of claim 1, wherein the search query comprises a natural language text sequence, the keyword representation comprises a text unit from the natural language text sequence, and the embedding representation comprises a numerical vector for the natural language text sequence.

3. The computer-implemented method of claim 1, wherein the plurality of source text attributes and the plurality of source embedding attributes respectively correspond to a plurality of channel-specific features within the domain channel.

4. The computer-implemented method of claim 1, wherein:
(ii) the source text attribute corresponds to the channel-specific feature, and
(iii) the source embedding attribute corresponds to the channel-specific feature.

5. The computer-implemented method of claim 1, wherein the plurality of domain channels comprises:
(i) a first domain channel comprising a plurality of first channel features corresponding to a first topic type;
(ii) a second domain channel comprising a plurality of second channel features corresponding to a second topic type;
(iii) a third domain channel comprising a plurality of third channel features corresponding to a third topic type;
(iv) a fourth domain channel comprising a plurality of fourth channel features corresponding to a fourth topic type; and
(v) a fifth domain channel comprising a plurality of fifth channel features corresponding to a fifth topic type.

6. The computer-implemented method of claim 1, further comprising:
generating, using a language model, an expanded query for the search query; and
generating the keyword representation and the embedding representation for the search query based on the expanded query.

7. The computer-implemented method of claim 6, wherein the language model is trained based on the plurality of source text attributes from the domain channel.

8. A computing system comprising memory and one or more processors communicatively coupled to the memory, the one or more processors configured to:
generate a keyword representation and an embedding representation for a search query;
generate a plurality of keyword similarity scores, wherein a keyword similarity score of the plurality of keyword similarity scores is between the keyword representation and a source text attribute of a plurality of source text attributes from a domain channel of a plurality of domain channels, wherein the domain channel comprises a channel-specific feature for a query result data object of a plurality of query result data objects;
generate a plurality of embedding similarity scores, wherein an embedding similarity score of the plurality of embedding similarity scores is between the embedding representation and a source embedding attribute of a plurality of source embedding attributes from the domain channel;
generate an intermediate query resolution for the search query based on a plurality of aggregated similarity scores, wherein:
(1) an aggregated similarity score of the plurality of aggregated similarity scores comprises a weighted combination of (i) the keyword similarity score of the plurality of keyword similarity scores and (ii) the embedding similarity score of the plurality of embedding similarity scores, and
(2) the intermediate query resolution comprises the channel-specific feature for the query result data object; and provide data indicative of a query resolution based on the intermediate query resolution, wherein the query resolution comprises the query result data object.

9. The computing system of claim 8, wherein the search query comprises a natural language text sequence, the keyword representation comprises a text unit from the natural language text sequence, and the embedding representation comprises a numerical vector for the natural language text sequence.

10. The computing system of claim 8, wherein the plurality of source text attributes and the plurality of source embedding attributes respectively correspond to a plurality of channel-specific features within the domain channel.

11. The computing system of claim 8, wherein:
    (ii) the source text attribute corresponds to the particular channel-specific feature, and
    (iii) the source embedding attribute corresponds to the particular channel-specific feature.

12. The computing system of claim 8, wherein the plurality of domain channels comprises:
    (i) a first domain channel comprising a plurality of first channel features corresponding to a first topic type;
    (ii) a second domain channel comprising a plurality of second channel features corresponding to a second topic type;
    (iii) a third domain channel comprising a plurality of third channel features corresponding to a third topic type;
    (iv) a fourth domain channel comprising a plurality of fourth channel features corresponding to a fourth topic type; and
    (v) a fifth domain channel comprising a plurality of fifth channel features corresponding to a fifth topic type.

13. One or more non-transitory computer-readable storage media including instructions that, when executed by one or more processors, cause the one or more processors to:
    generate a keyword representation and an embedding representation for a search query;
    generate a plurality of keyword similarity scores, wherein a keyword similarity score of the plurality of keyword similarity scores is between the keyword representation and a source text attribute of a plurality of source text attributes from a domain channel of a plurality of domain channels, wherein the domain channel comprises a channel-specific feature for a query result data object of a plurality of query result data objects;
    generate a plurality of embedding similarity scores, wherein an embedding similarity score of the plurality of embedding similarity scores is between the embedding representation and a source embedding attribute of a plurality of source embedding attributes from the domain channel;
    generate an intermediate query resolution for the search query based on a plurality of aggregated similarity scores, wherein:
        (1) an aggregated similarity score of the plurality of aggregated similarity scores comprises a weighted combination of (i) the keyword similarity score of the plurality of keyword similarity scores and (ii) the embedding similarity score of the plurality of embedding similarity scores, and
        (2) the intermediate query resolution comprises the channel-specific feature for the query result data object; and
    provide data indicative of a query resolution based on the intermediate query resolution, wherein the query resolution comprises the query result data object.

14. The one or more non-transitory computer-readable storage media of claim 13, wherein the one or more processors are further caused to:
    generate, using a language model, an expanded query for the search query; and
    generate the keyword representation and the embedding representation for the search query based on the expanded query.

* * * * *